United States Patent
Aoki et al.

(10) Patent No.: US 10,250,286 B2
(45) Date of Patent: Apr. 2, 2019

(54) WIRELESS COMMUNICATION APPARATUS AND ELECTRONIC APPARATUS

(71) Applicant: CANON KABUSHIKI KAISHA, Tokyo (JP)

(72) Inventors: Makoto Aoki, Tokyo (JP); Daiki Abe, Nishitokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 15/041,007

(22) Filed: Feb. 10, 2016

(65) Prior Publication Data

US 2016/0241288 A1 Aug. 18, 2016

(30) Foreign Application Priority Data

Feb. 18, 2015 (JP) ................. 2015-029368

(51) Int. Cl.
*H01Q 1/24* (2006.01)
*H04B 1/3827* (2015.01)
(Continued)

(52) U.S. Cl.
CPC ......... *H04B 1/3838* (2013.01); *H01Q 1/2291* (2013.01); *H01Q 1/243* (2013.01);
(Continued)

(58) Field of Classification Search
CPC ........ H01Q 1/2291; H01Q 1/48; H01Q 1/243; H01Q 1/528; H01Q 9/42; H04B 1/3838
(Continued)

(56) References Cited

U.S. PATENT DOCUMENTS

2006/0214849 A1* 9/2006 Fabrega-Sanchez ...................... G02B 27/62
343/700 MS
2013/0271329 A1 10/2013 Sato
(Continued)

FOREIGN PATENT DOCUMENTS

CN 101147293 3/2008
JP 2000-323921 11/2000
(Continued)

OTHER PUBLICATIONS

David M. Pozar, Microwave Engineering, 1998, Willey, Second Edition, p. 20.*
(Continued)

*Primary Examiner* — Hai Tran
(74) *Attorney, Agent, or Firm* — Fitzpatrick, Cella, Harper & Scinto

(57) ABSTRACT

There is provided a wireless communication apparatus, including: an antenna including: an antenna element having one end portion that is opened; and a ground conductor to be used as a ground, to which another end portion of the antenna element is connected; a wireless device connected to the antenna; and a blocking member, which is arranged so as to be opposed to the antenna, and is configured to block an electromagnetic wave, wherein the blocking member is arranged so as to, in plan view from the blocking member side in a direction toward the antenna, avoid overlapping at least the one end portion of the antenna element and overlap the another end portion of the antenna element.

14 Claims, 21 Drawing Sheets

(51) Int. Cl.
*H01Q 1/22* (2006.01)
*H01Q 1/48* (2006.01)
*H01Q 1/52* (2006.01)
*H01Q 9/42* (2006.01)

(52) U.S. Cl.
CPC .............. *H01Q 1/48* (2013.01); *H01Q 1/528* (2013.01); *H01Q 9/42* (2013.01)

(58) Field of Classification Search
USPC .......................................... 343/700 MS, 702
See application file for complete search history.

(56) References Cited

U.S. PATENT DOCUMENTS

2014/0085146 A1* 3/2014 Azuma .................... H01Q 1/38
343/700 MS
2014/0197994 A1* 7/2014 Hossain ................. H01Q 1/273
343/700 MS

FOREIGN PATENT DOCUMENTS

| JP | 2002-76735 | 3/2002 |
| JP | 2002-271468 | 9/2002 |
| JP | 2005-045646 A | 2/2005 |
| JP | 2013-223004 | 10/2013 |

OTHER PUBLICATIONS

Japanese Office Action dated Nov. 13, 2018 during prosecution of related Japanese application No. 2015-029368. (English-language machine translation included.).

Chinese Office Action dated Jan. 24, 2019 during prosecution of related Chinese application No. 201610085023.6. (Whole English-language translation included.).

* cited by examiner

WIRELESS COMMUNICATION APPARATUS AND ELECTRONIC APPARATUS

BACKGROUND OF THE INVENTION

Field of the Invention

The present invention relates to a wireless communication apparatus including a blocking member configured to block an electromagnetic wave radiated from an antenna, and an electronic apparatus including a wireless communication apparatus.

Description of the Related Art

In recent years, a wireless communication apparatus having a wireless communication function has been mounted to an electronic apparatus that is an image pickup apparatus (e.g., a digital camera), which enables the image pickup apparatus to wirelessly transmit a signal of a picked-up image to another camera or a PC (Personal Computer) by a wireless LAN (Local Area Network), Bluetooth (trademark), or the like. In wireless communication by a wireless LAN, Bluetooth (trademark), or the like, a radio wave of a 2.4 [GHz] band or a 5 [GHz] band is used. A wireless communication apparatus is built into an electronic apparatus in some cases. In other cases, a wireless communication apparatus is mounted to, for example, a digital single-lens reflex camera that is an image pickup apparatus as an external option. Mounting this option to a camera enables, for example, wireless communication to/from a communication partner separated from the camera by 100 meters or more.

In this type of wireless communication apparatus, when a high-power electromagnetic wave radiated from an antenna intrudes into a human body and its energy is absorbed into the human body, there is a concern of a local temperature increase in the human body. There has been pointed out a possibility of, for example, an increased risk of developing cataract due to this local temperature increase in the human body. For this reason, in each country, a regulatory value of an absorption amount of the electromagnetic wave into a human body is defined as a specific absorption ratio (SAR) value.

As a technology for suppressing the SAR value below its regulatory value, as disclosed in Japanese Patent Application Laid-Open No. 2005-45646, there has been proposed a configuration in which a metal plate having larger external dimensions than those of an antenna is arranged between a human body and the antenna so that a propagation direction of a radio wave is limited to the one opposite to the human body.

However, with the configuration of Japanese Patent Application Laid-Open No. 2005-45646, although the SAR value is decreased through the arrangement of the metal plate, there is a problem in that radiation efficiency of the electromagnetic wave at a communication frequency is decreased due to resonance between the metal plate and the antenna.

Moreover, as a result of measurement of directivity of the electromagnetic wave in the antenna using the configuration in which the entire antenna is shielded with the metal plate as disclosed in Japanese Patent Application Laid-Open No. 2005-45646, an amount of radio waves radiated in the direction toward the metal plate (direction toward the human body) was decreased through the arrangement of the metal plate. Even under a state in which the amount of radio waves radiated toward the metal plate side is thus decreased, communication can be established when communication partners exist in various directions from the antenna as in the case of a base station of mobile phones. However, under a situation in which one-to-one communication is performed between, for example, a camera and a PC, when a communication partner exists in the direction of the metal plate, there is a problem in that a communicable distance or an effective data transfer rate is significantly decreased due to a bias of the directivity of the electromagnetic wave in the antenna.

SUMMARY OF THE INVENTION

In view of the above, it is an object of the present invention to decrease a SAR value while decreasing a bias of directivity of an electromagnetic wave in an antenna and enhancing radiation efficiency of the electromagnetic wave at a communication frequency at the same time.

According to one embodiment of the present invention, there is provided a wireless communication apparatus, including: an antenna including: an antenna element having one end portion that is opened; and a ground conductor to be used as a ground, to which another end portion of the antenna element is connected; a wireless device connected to the antenna; and a blocking member, which is arranged so as to be opposed to the antenna, and is configured to block an electromagnetic wave, wherein the blocking member is arranged so as to, in plan view from the blocking member side in a direction toward the antenna, avoid overlapping at least the one end portion of the antenna element and overlap the another end portion of the antenna element.

Further, according to another embodiment of the present invention, there is provided a wireless communication apparatus, including: an antenna including: an antenna element having one end portion that is opened; and a ground conductor to be used as a ground, to which another end portion of the antenna element is connected; a wireless device connected to the antenna; and a blocking member, which is arranged so as to be opposed to the antenna, and is configured to block an electromagnetic wave, wherein the blocking member is arranged so as to, in plan view from the blocking member side in a direction toward the antenna, avoid overlapping at least a position where an electric field strength of the antenna is largest.

Further features of the present invention will become apparent from the following description of exemplary embodiments with reference to the attached drawings.

DESCRIPTION OF THE EMBODIMENTS

Modes for carrying out the present invention are described below in detail based on embodiments with reference to the drawings.

First Embodiment

Figure 1:
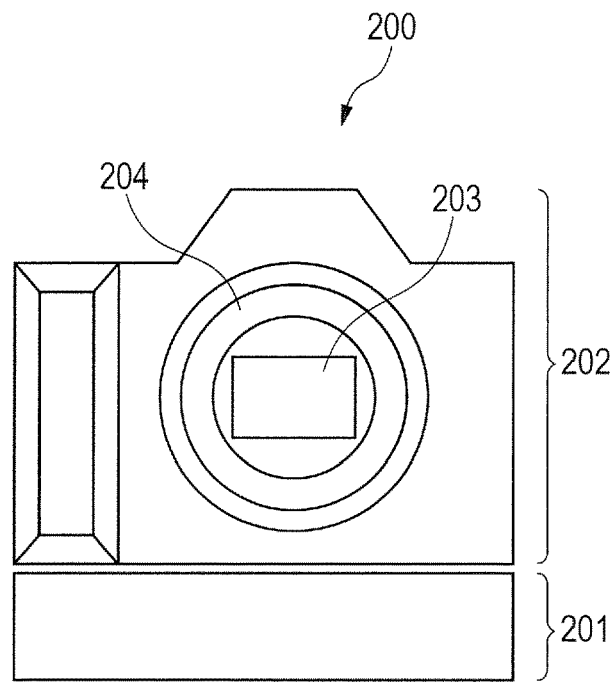
FIG. 1 is an explanatory diagram for illustrating a schematic configuration of an image pickup apparatus as an example of an electronic apparatus according to a first embodiment of the present invention.

FIG. 1 is an explanatory diagram for illustrating a schematic configuration of an image pickup apparatus as an example of an electronic apparatus according to a first embodiment of the present invention. The image pickup apparatus 200 includes a camera main body 202 and a wireless communication apparatus (wireless transmitter) 201 mounted to the camera main body 202. The camera main body 202 includes an image pickup element 203. A replaceable lens (not shown) is mounted to a mount 204 of the camera main body 202. An image signal generated based on an image picked up by the image pickup element 203 is output to the wireless communication apparatus 201.

The wireless communication apparatus 201 wirelessly transmits the image signal to a camera (not shown) or a PC (not shown) by a wireless LAN, Bluetooth (trademark), or the like. For wireless communication of the wireless LAN, Bluetooth (trademark), or the like, a radio wave of a 2.4 [GHz] band (e.g., a 2.45 [GHz] band) or a 5 [GHz] band is used. Note that, although a case is described in the first embodiment where the wireless communication apparatus 201 is a member different from the camera main body 202 and is externally mounted to the camera main body 202, the wireless communication apparatus 201 may be built into the camera main body 202.

Figure 2:
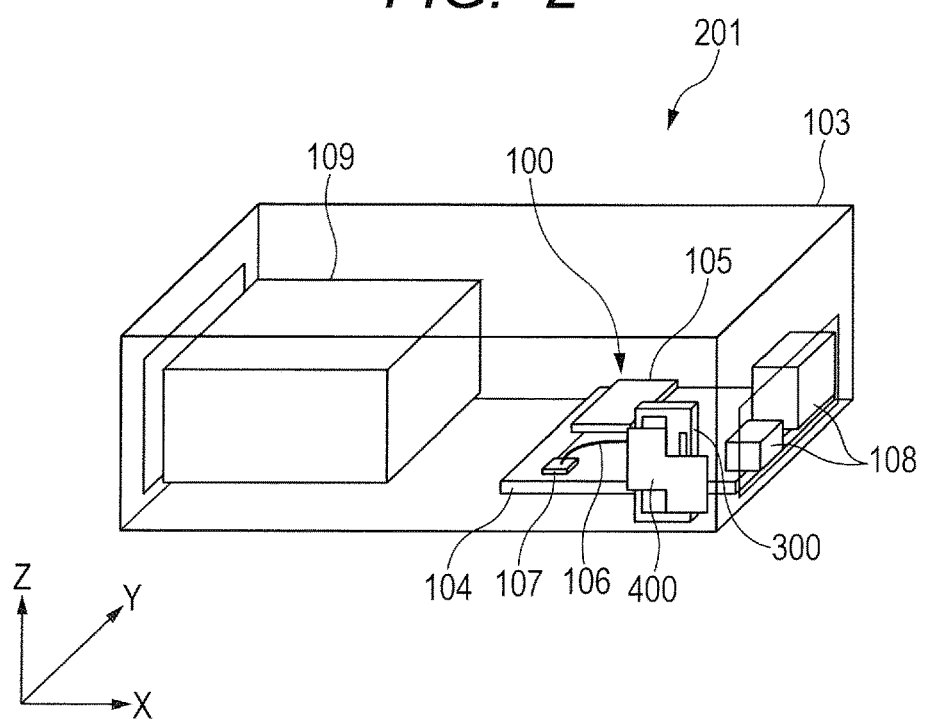
FIG. 2 is a transparent view for illustrating a schematic configuration of a wireless communication apparatus according to the first embodiment of the present invention.

FIG. 2 is a transparent view for illustrating a schematic configuration of the wireless communication apparatus 201 according to the first embodiment of the present invention. The wireless communication apparatus 201 includes an exterior housing 103 formed of a resin or the like, and a printed circuit board 100, an antenna 300, a metal plate 400 serving as a blocking member, a battery 109, which are arranged inside the exterior housing 103. The blocking member is a member configured to block an electromagnetic wave. "Blocking the electromagnetic wave" means absorbing or reflecting the electromagnetic wave. In the first embodiment, the blocking member is the metal plate 400, which is a metal member. The following description is directed to a case where a material of the metal plate 400 is stainless steel, but the material of the metal plate 400 may be any metal material as long as a metal material to be used effectively blocks the electromagnetic wave. For example, iron, copper, or aluminum may also be used as the metal material. Further, for example, the blocking member may also be a conductive resin (resin having a metal material kneaded therein).

The printed circuit board 100 includes a printed wiring board 104. The printed circuit board 100 further includes an IC 105 serving as a wireless device, a connector 107 connected to the IC 105 through wiring of the printed wiring board 104, and an external connector 108 exposed to the outside from the exterior housing 103, which are implemented on the printed wiring board 104. A cable (not shown) can be connected to the external connector 108. A cable 106 has one end connected to the antenna 300. The cable 106 has the other end connected to the connector 107. With this connection, the IC 105 is connected to the antenna 300 through the cable 106. The IC 105 is the wireless device configured to wirelessly transmit at least a signal wave. The IC 105 processes the acquired image signal to modulate a signal wave into the one having a frequency within a communication frequency band (e.g., the 2.4 [GHz] band or the 5 [GHz] band), and wirelessly transmits the modulated signal wave via the antenna 300.

The antenna 300 only needs to be the one configured to radiate the electromagnetic wave at the communication frequency, and an inverted F antenna is used as the antenna 300 in the first embodiment. For the purpose of reducing a SAR value, the metal plate 400 is arranged so as to be opposed to the antenna 300. Specifically, the metal plate 400 and the antenna 300 are arranged in the stated order in a direction toward the inside of the exterior housing 103. The metal plate 400 and the antenna 300 are arranged so that their surfaces are substantially parallel to each other. Note that, a member (not shown) formed of a dielectric material (insulator) may be interposed between the antenna 300 and the metal plate 400.

A thickness of the metal plate 400 needs to be set to a skin thickness d or larger, which is determined by a frequency of current flowing through the antenna 300. For example, when SUS (stainless steel) is used as the material of the metal plate 400, the skin thicknesses d at respective frequencies are shown in Table 1.

TABLE 1

|  | 1 KHz | 10 KHz | 100 KHz | 1 MHz | 10 MHz | 100 MHz | 1 GHz | 10 GHz |
|---|---|---|---|---|---|---|---|---|
| d [mm] | 15.174 | 4.799 | 1.517 | 0.480 | 0.152 | 0.048 | 0.015 | 0.005 |

Note that, the skin thickness is calculated as $d=\sqrt{(2\times\rho/\omega\mu)}$, where an electrical conductivity σ [S/m] and a relative permeability μS are σ=1,100,000 and μS=1, respectively.

Figure 3A:
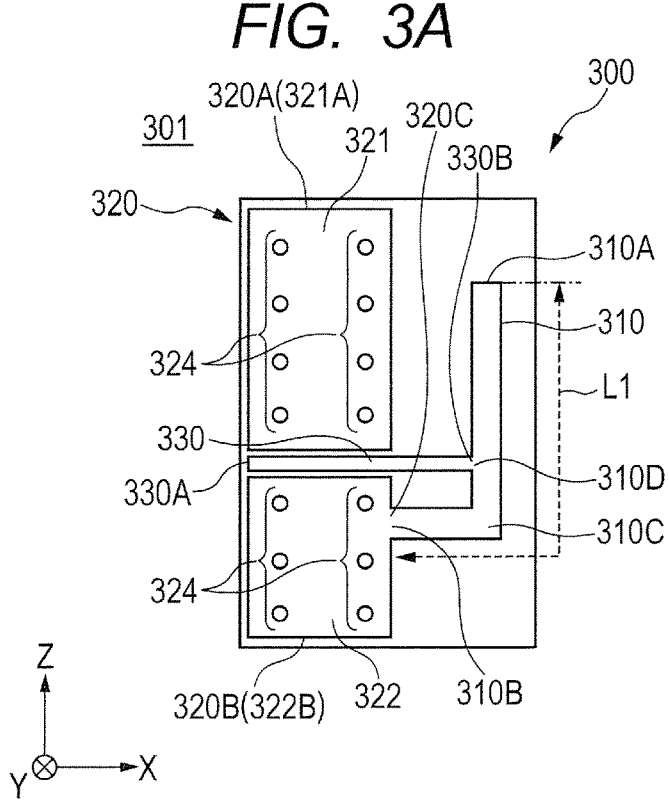
FIG. 3A is a plan view for illustrating a first conductor layer of a printed wiring board forming an antenna.
Figure 3B:
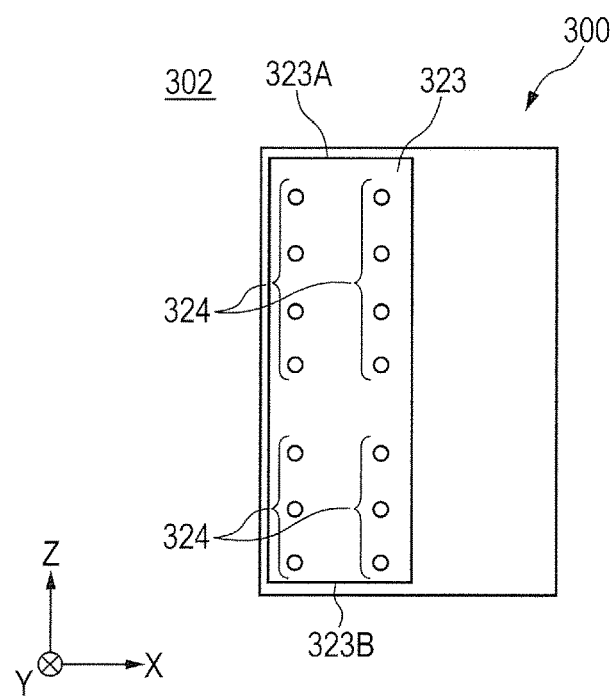
FIG. 3B is a plan view for illustrating a second conductor layer of the printed wiring board forming the antenna.

FIG. 3A and FIG. 3B are explanatory views for illustrating the antenna 300. The antenna 300 is formed of a printed wiring board, and includes at least two conductor layers. In the first embodiment, the antenna 300 includes conductor layers 301 and 302. FIG. 3A is a plan view for illustrating the conductor layer 301 serving as a first conductor layer of the printed wiring board forming the antenna 300, and FIG. 3B is a plan view for illustrating the conductor layer 302 serving as a second conductor layer of the printed wiring board forming the antenna 300. Specifically, FIG. 3A and FIG. 3B are views of the antenna 300 when viewed from a perpendicular direction (opposing direction from the metal plate 400 side toward the antenna 300 side: an arrow Y direction), which is perpendicular to a surface of the metal plate 400 illustrated in FIG. 2.

The conductor layer 301 and the conductor layer 302 are adjacent to each other through intermediation of an insulator layer. The conductor layers 301 and 302 are layers on which a conductor is mainly arranged, and the insulator layer is a layer on which an insulator (dielectric material) is mainly arranged. Examples of the insulator other than the conductor of the printed wiring board forming the antenna 300 include a glass epoxy resin such as FR4.

As illustrated in FIG. 3A and FIG. 3B, the antenna 300 includes an antenna element 310, a ground conductor 320, and a signal line 330. The antenna element 310, the ground conductor 320, and the signal line 330 are formed of conductors. The ground conductor 320 is used as a ground of the antenna element 310.

The antenna element 310 is formed of a long and strip-shaped conductor pattern. One end portion 310A of the antenna element 310 in its longitudinal direction is an open end portion that is opened, and another end portion 310B of the antenna element 310 in its longitudinal direction is short-circuited to the ground conductor 320.

The another end portion 310B of the antenna element 310 is also a connection portion 320C where the antenna element 310 is connected to the ground conductor 320. The antenna element 310 may be formed into a linear shape, but in this embodiment, the antenna element 310 is bent into an L-shape so that the one end portion 310A of the antenna element 310 in its longitudinal direction approaches the ground conductor 320. Specifically, the antenna element 310 is formed so as to extend in an arrow X direction from the another end portion 310B to a bent portion 310C and extend in an arrow Z direction, which crosses (is orthogonal to) the arrow X direction, from the bent portion 310C to the one end portion 310A.

The signal line 330 is a power supply line to which current of the signal wave is supplied from the IC 105 via the cable 106. The signal line 330 is a conductor pattern formed so as to extend in the arrow X direction. One end portion 330A of the signal line 330 in its longitudinal direction (wiring direction: the arrow X direction) is connected to the cable 106 illustrated in FIG. 2. In other words, the one end portion 330A of the signal line 330 is connected to the IC 105 serving as the wireless device via the cable 106. Another end portion 330B of the signal line 330 in the arrow X direction is connected to a connection portion (intermediate portion) 310D located between the one end portion 310A and the another end portion 310B of the antenna element 310. The antenna element 310 and the signal line 330 are formed on the conductor layer 301.

The ground conductor 320 includes a ground pattern 321 formed on the conductor layer 301, which serves as a first ground pattern, and a ground pattern 322 formed on the conductor layer 301, which serves as a second ground pattern. The ground conductor 320 further includes a ground pattern 323 formed on the conductor layer 302, which serves as a third ground pattern. The ground conductor 320 has a plurality of vias 324 for connecting the ground patterns 321 and 322 and the ground pattern 323 to each other. With this, the ground pattern 323 and the ground patterns 321 and 322 are electrically connected to each other through the plurality of vias 324. The ground patterns 321 and 322 are arranged on both sides of the signal line 330 in the arrow Z direction, which crosses (is orthogonal to) the wiring direction (arrow X direction) of the signal line 330. The ground patterns 321 and 322 are formed into a quadrilateral shape as its external shape (more specifically, a rectangular shape as its external shape) when viewed in the arrow Y direction. Further, the ground pattern 323 is formed into a quadrilateral shape as its external shape including the ground patterns 321 and 322 (more specifically, a rectangular shape as its external shape) when viewed in the arrow Y direction.

The ground conductor 320 includes a side end portion 320A, which serves as a first side end portion in the arrow Z direction, and a side end portion 320B, which is arranged on a side opposite to the side end portion 320A and serves as a second side end portion. Of the pair of side end portions 320A and 320B, the side end portion 320A is located relatively closer to the one end portion 310A of the antenna element 310. The arrow Z direction corresponds to a wiring direction along which the antenna element 310 extends from the bent portion 310C of the antenna element 310 to the one end portion 310A of the antenna element 310. In the first embodiment, the ground conductor 320 includes the pair of ground patterns 321 and 322 arranged on both sides of the signal line 330 in the arrow Z direction. Accordingly, in the first embodiment, the side end portion 320A of the ground conductor 320 corresponds to an end portion 321A of the ground pattern 321, which is located on a side opposite to another side adjacent to the signal line 330 in the arrow Z direction. Further, the side end portion 320B of the ground conductor 320 corresponds to an end portion 322B of the ground pattern 322, which is located on a side opposite to another side adjacent to the signal line 330 in the arrow Z direction.

In this embodiment, in addition to the pair of ground patterns 321 and 322 arranged on both sides of the signal line 330 in the Z direction, the ground conductor 320 includes the ground pattern 323 extending in the Z direction. The ground pattern 323 includes an end portion 323A in the Z direction and an end portion 323B located on a side opposite to the end portion 323A in the Z direction. When viewed in the −Y direction, the end portion 323A of the ground pattern 323 overlaps the end portion 321A of the ground pattern 321. Further, when viewed in the −Y direction, the end portion 323B of the ground pattern 323 overlaps the end portion 322B of the ground pattern 322.

Accordingly, the side end portion 320A of the ground conductor 320 corresponds also to the end portion 323A of the ground pattern 323. Further, the side end portion 320B of the ground conductor 320 corresponds also to the end portion 323B of the ground pattern 323.

Note that, although the case is described where the end portion 321A overlaps the end portion 323A when viewed in the −Y direction, when one of the end portions overhangs in the +Z direction, the overhanging end portion is the side end portion 320A of the ground conductor 320. Further, although the case is described where the end portion 322B overlaps the end portion 323B when viewed in the −Y direction, when one of the end portions overhangs in the −Z direction, the overhanging end portion is the side end portion 320B of the ground conductor 320.

Further, although the number of conductor layers of the printed wiring board forming the antenna 300 is two in this embodiment, the number of conductor layers may be three or more. In that case, the ground pattern 323 may be arranged on each of the conductor layers other than the conductor layer 301.

In order to efficiently radiate the electromagnetic wave, a dimension L1 of the antenna element 310 along its longitudinal direction (signal propagation direction) is set to a length that is a ¼ of a wavelength λ at the communication frequency.

Figure 4:
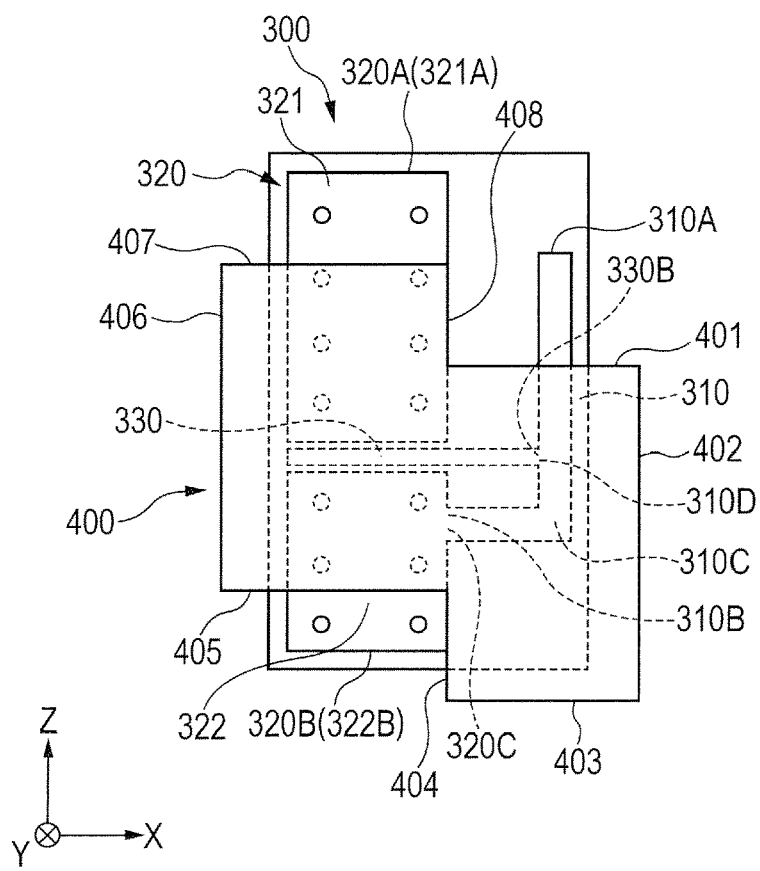
FIG. 4 is a plan view for illustrating how an antenna and a metal plate are arranged relative to each other in FIG. 1.

FIG. 4 is a plan view for illustrating how the antenna 300 and the metal plate 400 are arranged relative to each other in FIG. 1. FIG. 4 is a plan view for illustrating the antenna 300 and the metal plate 400 when viewed in the arrow Y direction.

As illustrated in FIG. 4, the metal plate 400 is arranged so as not to overlap at least the one end portion 310A of the antenna element 310 when viewed in the arrow Y direction. In other words, the metal plate 400 is formed so as to avoid at least the one end portion 310A of the antenna element 310 when viewed in the arrow Y direction.

Further, in the first embodiment, the metal plate 400 is arranged so as not to overlap the side end portion 320A of the ground conductor 320 when viewed in the arrow Y direction. In other words, the metal plate 400 is formed so as to avoid the side end portion 320A of the ground conductor 320 when viewed in the arrow Y direction.

Further, in the first embodiment, the metal plate 400 is arranged so as not to overlap the side end portion 320B of the ground conductor 320 when viewed in the arrow Y direction. In other words, the metal plate 400 is formed so as to avoid the side end portion 320B of the ground conductor 320 when viewed in the arrow Y direction.

Further, the metal plate 400 is arranged so as to overlap at least the another end portion 310B of the antenna element 310 (the connection portion 320C where the antenna element 310 and the ground conductor 320 are connected) when viewed in the arrow Y direction. In other words, the metal plate 400 is formed so as to overlap at least the another end portion 310B of the antenna element 310 when viewed in the arrow Y direction.

Further, the metal plate 400 is arranged so as to overlap at least the connection portion 310D where the signal line 330 and the antenna element 310 are connected (the another end portion 330B of the signal line 330) when viewed in the arrow Y direction. In other words, the metal plate 400 is formed so as to include the connection portion 310D where the signal line 330 and the antenna element 310 are connected when viewed in the arrow Y direction.

In summary, in the first embodiment, the metal plate 400 is arranged so as not to overlap the one end portion 310A of the antenna element 310, the side end portion 320A of the ground conductor 320, and the side end portion 320B of the ground conductor 320 when viewed in the arrow Y direction. Further, the metal plate 400 is arranged so as to overlap the remaining part of the antenna 300 excluding the one end portion 310A, the side end portion 320A, and the side end portion 320B when viewed in the arrow Y direction.

In the first embodiment, the metal plate 400 has a side 401 extending in the arrow X direction between the one end portion 310A of the antenna element 310 and the signal line 330 in the arrow Z direction and a side 402 extending in the arrow Z direction, which is located in the outside of an external shape of the antenna 300 and connected to the side 401. The metal plate 400 further has a side 403 extending in the arrow X direction, which is located in the outside of the external shape of the antenna 300 and connected to the side 402. The metal plate 400 further has a side 404 extending in the arrow Z direction, which is connected to the side 403 and overlaps a side of the ground pattern 322 connected to the another end portion 310B of the antenna element 310. The metal plate 400 further has a side 405, which intersects the ground pattern 322 in the arrow X direction and is connected to the side 404, and a side 406 extending in the arrow Z direction, which is located in the outside of the external shape of the antenna 300 and connected to the side 405. The metal plate 400 further has a side 407, which intersects the ground pattern 321 in the arrow X direction and is connected to the side 406. The metal plate 400 further has a side 408 extending in the arrow Z direction, which is connected to the sides 407 and 401 over the ground pattern 321.

Figure 5:
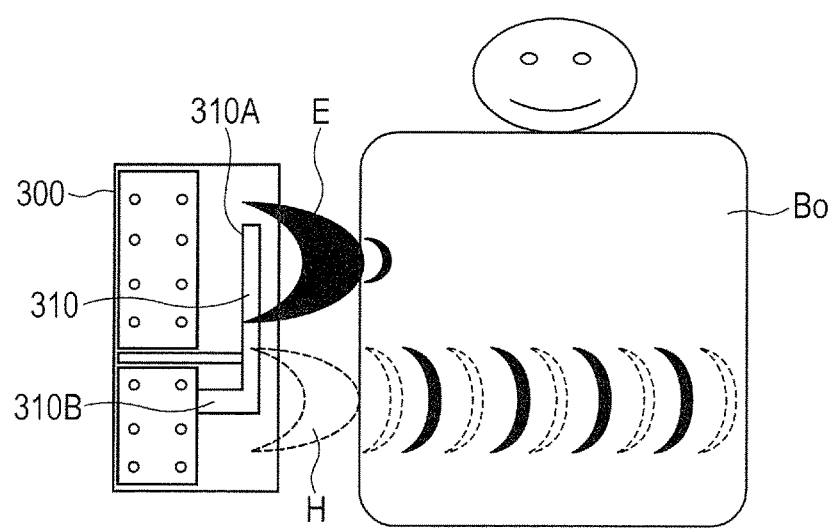
FIG. 5 is a conceptual diagram for illustrating distributions of an electric field and a magnetic field in the vicinity of the antenna and a human body.

Next, the electromagnetic wave radiated from the antenna 300 when the metal plate 400 is not provided is described. FIG. 5 is a conceptual diagram for illustrating distributions of an electric field and a magnetic field in the vicinity of the antenna 300 and a human body Bo. In FIG. 5, an electric field E is illustrated as the solid-line frame having a crescent shape, and a magnetic field H is illustrated as the broken-line frame having a crescent shape.

In the vicinity of the antenna 300, impedance is high in a portion close to the one end portion 310A that is the open end portion of the antenna element 310, and hence the electric field E is mainly formed. Further, impedance is low in the portion where the another end portion 310B of the antenna element 310 and the ground pattern are connected, and hence the magnetic field H is mainly formed.

When the antenna 300 and the human body Bo come close to each other, as illustrated in FIG. 5, the electric field E in the vicinity of the antenna 300 does not propagate through the inside of the human body Bo, and only the magnetic field H propagates therethrough. This is because the relative permittivity of the human body Bo is as high as about 50, and hence at an interface between the human body Bo and the air where an electric flux D is continuous, the electric field E attenuates steeply to as low as about 1/50 considering the electric field E with the use of the expression of $D=\varepsilon E$. This is also because the relative permeability of the human body Bo is 1, which is the same as that of the air, and hence at the interface between the human body Bo and the air where a magnetic flux B is continuous, the magnetic field H does not attenuate considering the magnetic field H with the use of the expression of $B=\mu H$.

The magnetic field H propagating into the human body Bo is subjected to wavelength shortening obtained by the expression of (wavelength $\lambda$)=$c/(f \times \sqrt{\varepsilon})$ to propagate through the inside of the human body Bo as the electromagnetic wave having the electric field E and the magnetic field H. As an example of the wavelength shortening, a wavelength at a frequency f of 5 [GHz] is 60 [mm] in the air when calculated assuming the light speed c as $3\times10^8$ [m/s], whereas the wavelength is shortened to 8.3 [mm] inside the human body Bo. From this fact, the strength of the SAR value is correlated with the magnetic field strength in the vicinity of the antenna 300.

Figure 6A:
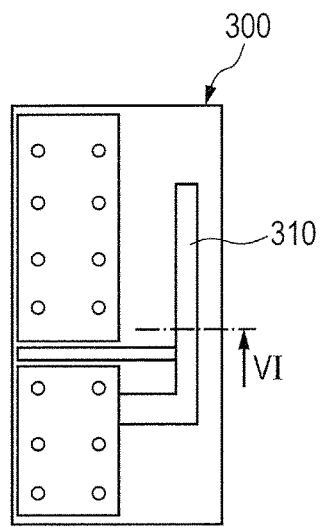
FIG. 6A is a plan view for illustrating the antenna.
Figure 6B:
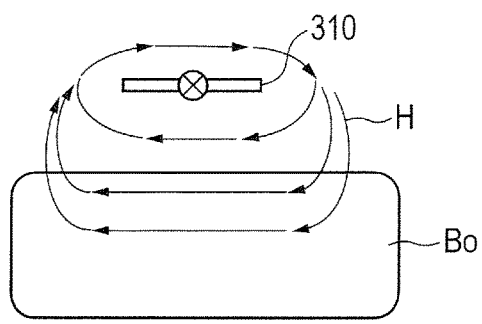
FIG. 6B is a diagram for illustrating a magnetic field distribution without a metal plate when a cross section taken along the alternate long and short dash line of FIG. 6A is viewed in an arrow VI direction.
Figure 6C:
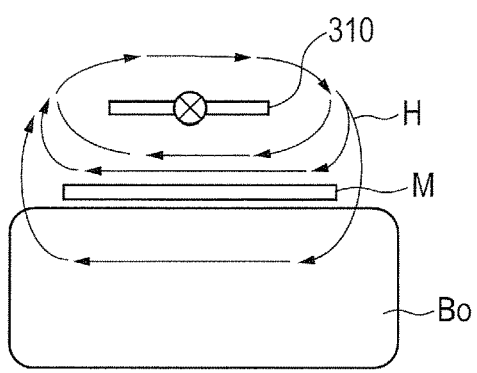
FIG. 6C is a diagram for illustrating a magnetic field distribution with a metal plate when the cross section taken along the alternate long and short dash line of FIG. 6A is viewed in the arrow VI direction.

FIG. 6A to FIG. 6C are conceptual diagrams for illustrating the current flowing through the antenna element 310 and a distribution of a magnetic field in the vicinity of the antenna element 310. FIG. 6A is a plan view for illustrating the antenna 300. FIG. 6B is a diagram for illustrating a magnetic field distribution between the antenna element 310 and the human body Bo without a metal plate M when a cross section taken along the alternate long and short dash line of FIG. 6A is viewed in an arrow VI direction. FIG. 6C is a diagram for illustrating a magnetic field distribution between the antenna element 310 and the human body Bo with the metal plate M when the cross section taken along the alternate long and short dash line of FIG. 6A is viewed in the arrow VI direction.

As illustrated in FIG. 6B, in the antenna element 310, the current flows in a direction perpendicular to the drawing sheet, and hence the magnetic field H is formed in the right-hand screw direction. When the metal plate M is not arranged, the magnetic field H intrudes into the human body Bo. In contrast, as illustrated in FIG. 6C, through the arrangement of the metal plate M, the magnetic field H passes between the antenna element 310 and the metal plate M, which results in decrease in SAR value.

Figure 7A:
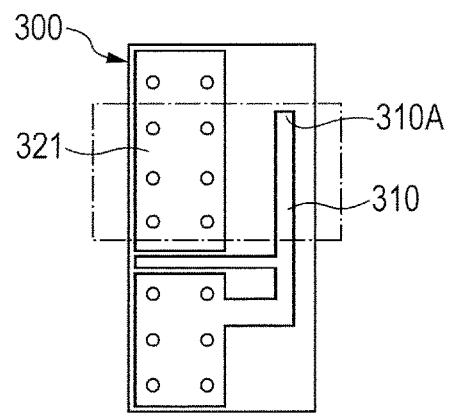
FIG. 7A is a plan view for illustrating the antenna.
Figure 7B:
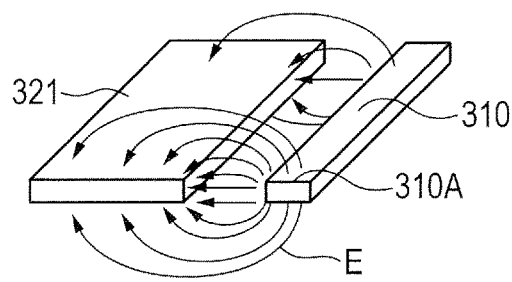
FIG. 7B is a perspective view for illustrating an electric field distribution without the metal plate in a region surrounded by the alternate long and short dash line of FIG. 7A.
Figure 7C:
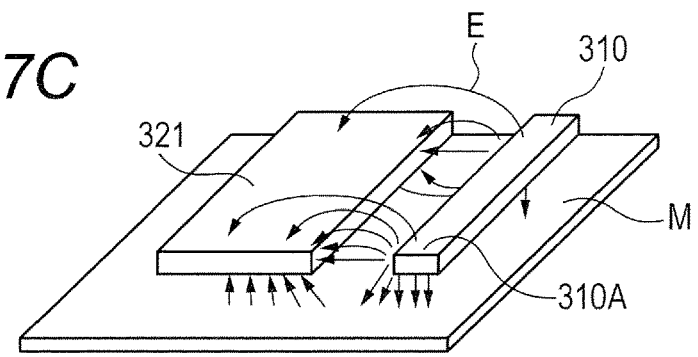
FIG. 7C is a perspective view for illustrating an electric field distribution in the region surrounded by the alternate long and short dash line of FIG. 7A when the metal plate is arranged so as to overlap one end portion of an antenna element.
Figure 7D:
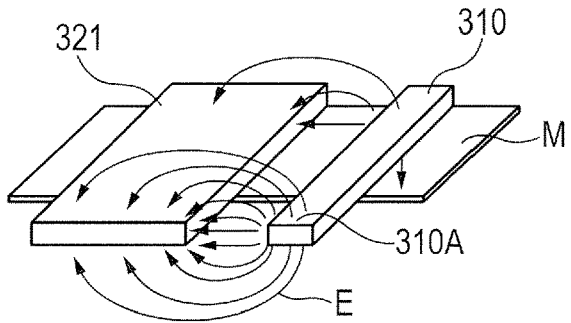
FIG. 7D is a perspective view for illustrating an electric field distribution in the region surrounded by the alternate long and short dash line of FIG. 7A when the metal plate is arranged so as not to overlap one end portion of the antenna element.

FIG. 7A to FIG. 7D are conceptual diagrams for illustrating an electric field distribution formed between the antenna element 310 and the ground pattern 321. FIG. 7A is a plan view for illustrating the antenna 300. FIG. 7B is a perspective view for illustrating an electric field distribution between the antenna element 310 and the ground pattern 321 without the metal plate M in a region surrounded by the alternate long and short dash line of FIG. 7A. FIG. 7C is a perspective view for illustrating an electric field distribution between the antenna element 310 and the ground pattern 321 in the region surrounded by the alternate long and short dash line of FIG. 7A when the metal plate M is arranged so as to overlap the one end portion 310A of the antenna element 310. FIG. 7D is a perspective view for illustrating an electric field distribution between the antenna element 310 and the ground pattern 321 in the region surrounded by the alternate long and short dash line of FIG. 7A when the metal plate M is arranged so as not to overlap the one end portion 310A of the antenna element 310. Note that, in FIG. 7B to FIG. 7D, the electric field E is indicated by the arrows.

As illustrated in FIG. 7B, the electric field E is the strongest in the vicinity of the one end portion 310A that is the open end portion of the antenna element 310, and the electric field E becomes weaker with a decreasing distance to the connection portion 320C (another end portion 310B) where the antenna element 310 is connected to the ground pattern along the longitudinal direction of the antenna element 310. In other words, the electric field strength is the largest at the one end portion 310A of the antenna element 310, and the electric field strength is the smallest at the another end portion 310B of the antenna element 310.

As illustrated in FIG. 7C, when the metal plate M whose size is larger than that of the antenna 300 is arranged, the electric field E formed between the antenna element 310 and the ground pattern 321 is coupled to the metal plate M, and hence the metal plate M causes a potential variation. This coupling prevents the radio wave from radiating from the antenna element 310 to space, and hence radiation efficiency decreases.

As illustrated in FIG. 7D, when the metal plate M is arranged so as not to overlap the one end portion 310A that is the open end portion of the antenna element 310, the radiation efficiency of the radio wave (signal wave) radiated from the antenna element 310 is enhanced.

Thus, the configuration for preventing decrease in radiation efficiency and communicable distance in the human body direction under the state in which the metal plate for reducing the SAR value is arranged is that the metal plate is arranged in the vicinity of the antenna where the magnetic field is strong and the metal plate is not arranged in a portion where the electric field is strong.

In view of the above, in the first embodiment, as illustrated in FIG. 4, the metal plate 400 is arranged so as not to overlap at least a position where the electric field strength is the largest, that is, the one end portion 310A of the antenna element 310, when viewed in the arrow Y direction. With this arrangement, the electric field coupling between the one end portion 310A of the antenna element 310 and the metal plate 400 can be suppressed. Accordingly, the bias of the directivity of the electromagnetic wave in the antenna 300 can be decreased, and the radiation efficiency of the electromagnetic wave at the communication frequency can be enhanced.

Through the enhancement of the radiation efficiency by decreasing the bias of the directivity of the electromagnetic wave in the antenna 300, the communicable distance in the direction toward the metal plate 400 (human body direction) can be made longer than when the entire antenna is shielded by the metal plate.

Further, the electric field strength is also large at the side end portion 320A of the ground conductor 320 forming the electric field coupling to the antenna element 310, that is, the end portion 321A of the ground pattern 321. Thus, in the first embodiment, as illustrated in FIG. 4, the metal plate 400 is arranged so as not to overlap the side end portion 320A (i.e., the end portion 321A) when viewed in the arrow Y direction. With this arrangement, the electric field coupling between the side end portion 320A of the ground conductor 320 (the end portion 321A of the ground pattern 321) and the metal plate 400 can be suppressed. Accordingly, the bias of the directivity of the electromagnetic wave in the antenna 300 can be effectively decreased, and the radiation efficiency of the electromagnetic wave at the communication frequency can be effectively enhanced.

Moreover, in the ground conductor 320, the electric flux is likely to be concentrated at the end portion, and hence the electric field strength is large also at the side end portion 320B located on the side opposite to the side end portion 320A. Thus, in the first embodiment, as illustrated in FIG. 4, the metal plate 400 is arranged so as not to overlap the side end portion 320B of the ground conductor 320 (i.e., the end portion 322B of the ground pattern 322) when viewed in the arrow Y direction. With this arrangement, the electric field coupling between the side end portion 320B of the ground conductor 320 (the end portion 322B of the ground pattern 322) and the metal plate 400 can be suppressed. Accordingly, the bias of the directivity of the electromagnetic wave in the antenna 300 can be decreased more effectively, and the radiation efficiency of the electromagnetic wave at the communication frequency can be effectively enhanced.

Further, in the first embodiment, as illustrated in FIG. 4, the metal plate 400 is arranged so as to overlap at least a position where the magnetic field strength is the largest, that is, the another end portion 310B of the antenna element 310 (so as to include the another end portion 310B), when viewed in the arrow Y direction. With such arrangement of the metal plate 400, the magnetic field affecting the human body can be blocked effectively, and hence the SAR value is decreased.

Further, the antenna 300 is the inverted F antenna, and the magnetic field strength is large also at the connection portion 310D where the signal line 330 and the antenna element 310 are connected. Thus, the metal plate 400 is arranged so as to overlap the connection portion 310D where the signal line 330 and the antenna element 310 are connected (so as to include the connection portion 310D) when viewed in the arrow Y direction. With such arrangement of the metal plate 400, the magnetic field affecting the human body can be blocked effectively, and hence the SAR value is decreased effectively.

In the above description, the metal plate 400 is arranged so as not to overlap the one end portion 310A of the antenna element 310 and the side end portions 320A and 320B of the ground conductor and to overlap the remaining part of the antenna 300 excluding those portions. However, the present invention is not limited to this configuration.

For example, the metal plate 400 may be arranged so as not to overlap the one end portion 310A of the antenna element 310 and to overlap the remaining part of the antenna 300 excluding this portion when viewed in the arrow Y direction. As another example, the metal plate 400 may be arranged so as not to overlap at least one of the one end portion 310A of the antenna element 310 and the side end portions 320A and 320B of the ground conductor 320 when viewed in the arrow Y direction. In this example, the metal plate 400 may be arranged so as to overlap the remaining part of the antenna 300 excluding at least one of those portions when viewed in the arrow Y direction.

Example 1

As an example of the antenna 300 and the metal plate 400 according to the embodiment described above, the following numerical experiment was conducted. In this experiment, power supplied to the antenna 300 that is the inverted F antenna was set to 13 [dBm], and a communication frequency was set to 2.45 [GHz]. MW-STUDIO, which is an electromagnetic field simulator manufactured by AET, INC., was used for calculation.

Figure 8A:
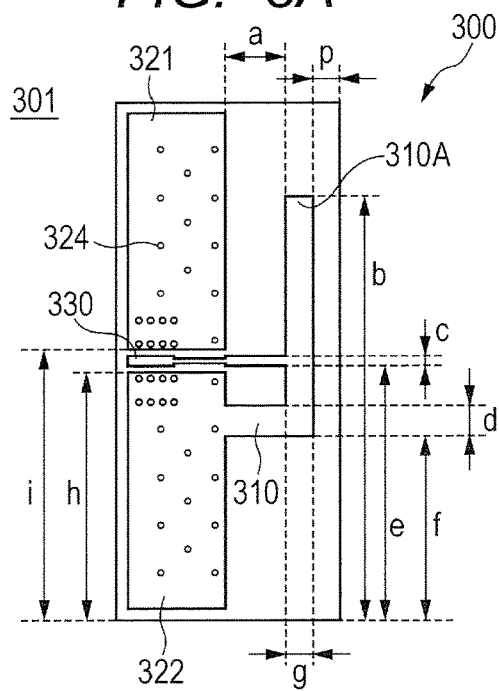
FIG. 8A is an external view for illustrating a calculation model for the first conductor layer of the antenna according to Example 1 of the present invention.
Figure 8B:
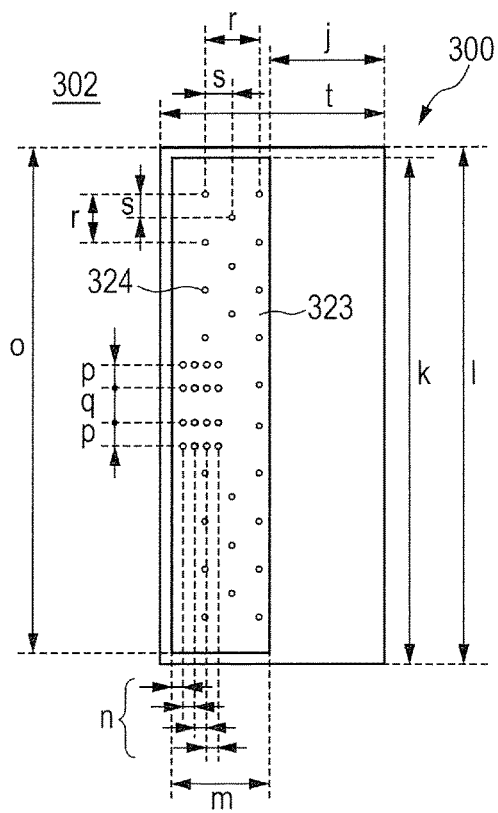
FIG. 8B is an external view for illustrating a calculation model for the second conductor layer of the antenna according to Example 1.

FIG. 8A and FIG. 8B are external views for illustrating calculation models for the antenna 300 according to Example 1 of the present invention. The antenna 300 is formed of the printed wiring board. FIG. 8A is an external view for illustrating the calculation model for the conductor layer 301, which serves as the first conductor layer of the antenna 300 formed of the printed wiring board. FIG. 8B is an external view for illustrating the calculation model for the conductor layer 302, which serves as the second conductor layer of the antenna 300 formed of the printed wiring board. Note that, in Example 1, the printed wiring board has a four-layer structure having four conductor layers, and the first and second conductor layers are illustrated in FIG. 8A and FIG. 8B, whereas third and fourth conductor layers are not shown.

A thickness of wiring was set to 35 [μm], a distance between the first and second conductor layers and a distance between the third and fourth conductor layers were each set to 0.2 [mm], a distance between the second and third conductor layers was set to 0.91 [mm], and a thickness of the dielectric material was set to 1.345 [mm].

Figure 9:
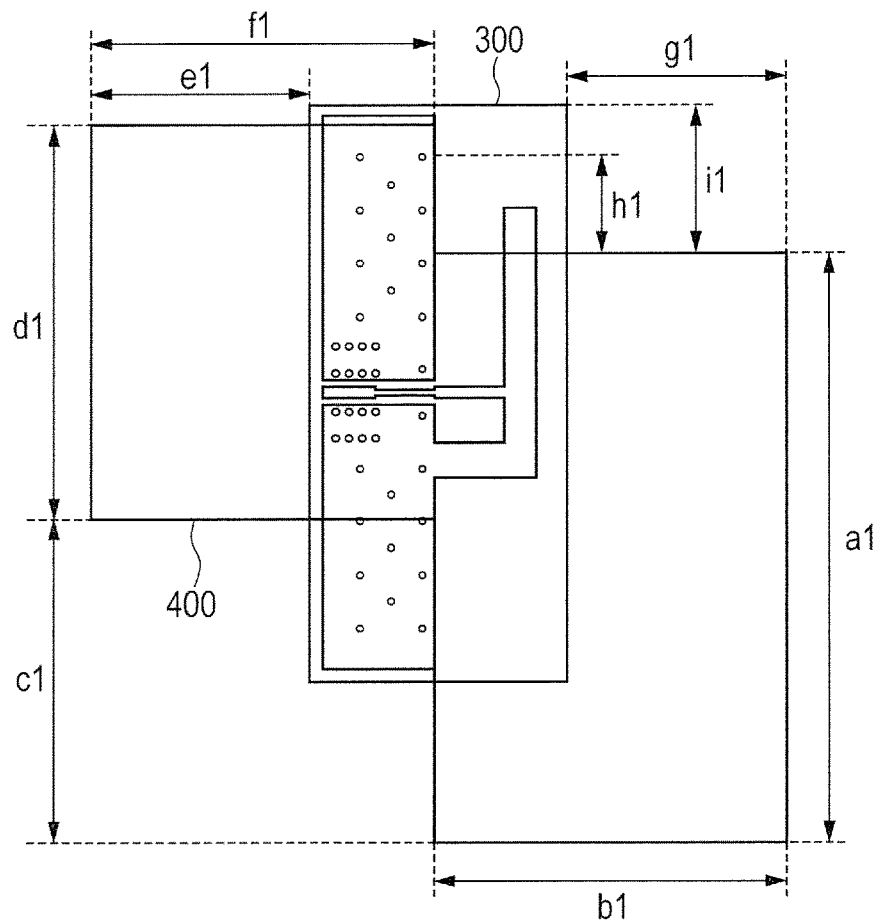
FIG. 9 is a view for illustrating positions where the antenna and the metal plate are arranged according to Example 1.
Figure 25:
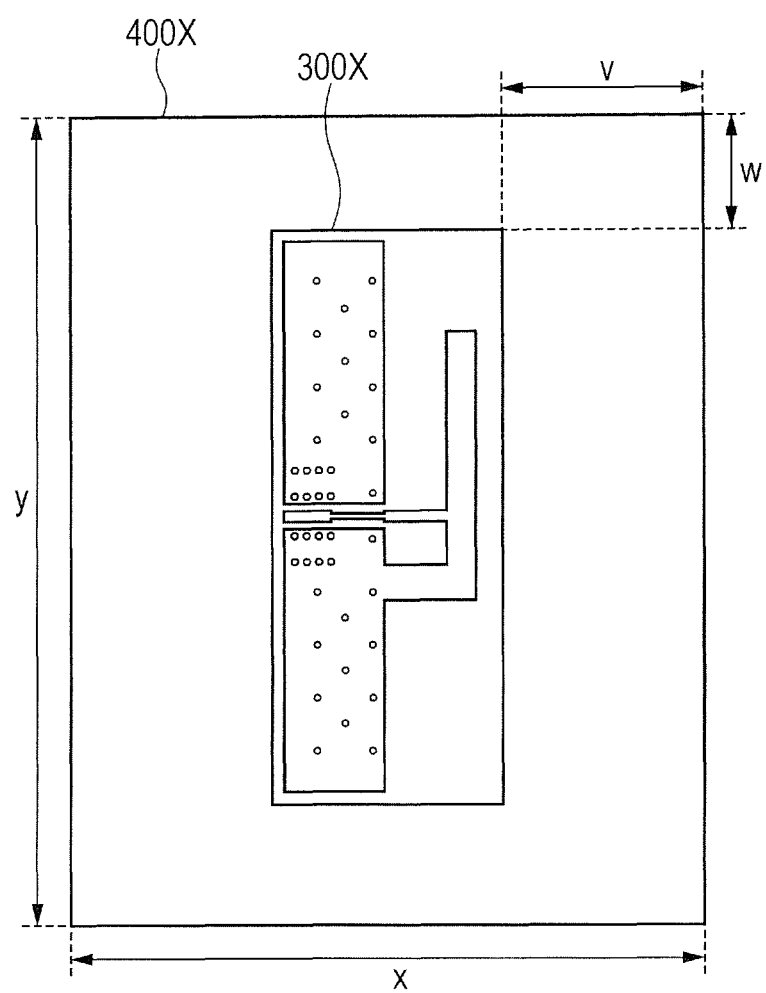
FIG. 25 is a view for illustrating positions where the antenna according to Comparative Example 1 of the present invention and the metal plate are arranged.

FIG. 9 is a view for illustrating positions where the antenna and the metal plate are arranged according to Example 1. FIG. 25 is a view for illustrating positions where an antenna and a metal plate are arranged according to Comparative Example 1 of the present invention. Note that, an antenna 300X according to Comparative Example 1 illustrated in FIG. 25 had the same configuration as that of the antenna 300 according to Example 1. Further, a metal plate 400X according to Comparative Example 1 illustrated in FIG. 25 differs from the metal plate 400 according to Example 1 in that the metal plate 400X had a size larger than that of the antenna 300X. In other words, the metal plate 400X had a size that covers the entire antenna 300X.

Note that, thicknesses of the metal plates 400 and 400X were each set to 0.5 [mm]. Dimensions of each of FIG. 8A, FIG. 8B, FIG. 9, and FIG. 25 are shown in Table 2.

TABLE 2

| Reference symbol of FIG. 8A | | | | | | | | |
|---|---|---|---|---|---|---|---|---|
| a | b | c | d | e | f | g | h | i |
| Dimension (mm) | | | | | | | | |
| 5.3 | 41.775 | 0.85 | 3.0 | 20.025 | 17.975 | 2.5 | 24.425 | 26.475 |

| Reference symbol of FIG. 8B | | | | | | | | | |
|---|---|---|---|---|---|---|---|---|---|
| j | k | l | m | n | o | p | q | r | s | t |
| Dimension (mm) | | | | | | | | | | |
| 10.2 | 49.975 | 50.9 | 8.5 | 1.0 | 49.05 | 2.4 | 3.25 | 4.7 | 2.35 | 19.8 |

| Reference symbol of FIG. 9 | | | | | | | | |
|---|---|---|---|---|---|---|---|---|
| a1 | b1 | c1 | d1 | e1 | f1 | g1 | h1 | i1 |
| Dimension (mm) | | | | | | | | |
| 51.8 | 25.2 | 31.0 | 32.8 | 15.0 | 24.6 | 15.0 | 12.0 | 14.1 |

| Reference symbol of FIG. 25 | | | | |
|---|---|---|---|---|
| u | v | w | x | y |
| Dimension (mm) | | | | |
| 2.6 | 15.0 | 15.0 | 49.8 | 80.9 |

Figure 10:
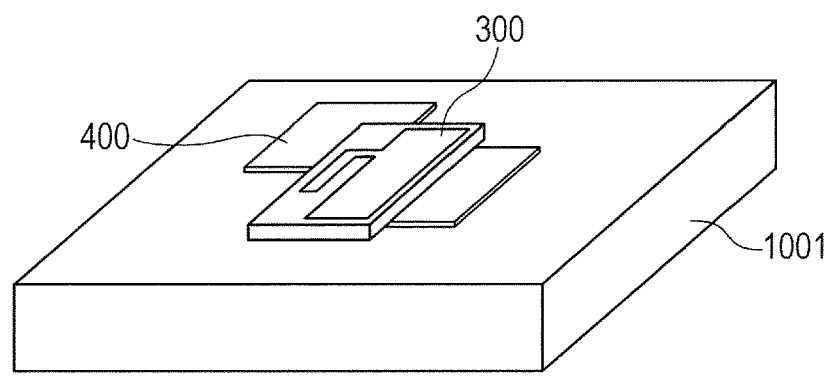
FIG. 10 is a perspective view for illustrating how the antenna and the metal plate are arranged relative to a human body phantom according to Example 1.

FIG. 10 is a perspective view for illustrating how the antenna and the metal plate are arranged relative to a human body phantom according to Example 1. As illustrated in FIG. 10, a human body phantom 1001, the metal plate 400, and the antenna 300 were arranged so that all of their surfaces were parallel to one another. A distance from the human body phantom 1001 to the metal plate 400 was set to 1 [mm], and a distance from the metal plate 400 to the antenna 300 was set to 2 [mm]. For calculation of the SAR value, a material constant of a solvent of the human body phantom 1001, which is used in the international standard measurement, was used, and an electrical conductivity σ was set to 2 [S/m], a relative permittivity was set to 52.21, Tan δ was set to 0.28, and a material density ρ was set to 1,000. The metal plate 400 was formed of stainless steel, and an electrical conductivity σ was set to 1,100,000 [S/m]. To calculate the SAR value, the electric field E within the human body phantom 1001 was measured, and the SAR value was calculated as SAR [W/Kg]=E×E×ρ/σ.

Communication performance was calculated under a state in which the human body phantom 1001 was removed, and three indices of radiation efficiency, directivity, and a transmission coefficient are calculated as the communication performance. The radiation efficiency was calculated by obtaining a ratio between power supplied to the signal line 330 at the communication frequency and total power of radiated electromagnetic waves passing through points separated from the antenna 300 by 1 [m]. The directivity was calculated by obtaining the ratio between the power at the signal line 330 at the communication frequency and the total power of electromagnetic waves passing through the points separated from the antenna 300 by 1 [m] and outputting the ratio along a circle having the antenna 300 as its center. The transmission coefficient was calculated by, considering reflection that occurs due to mismatch between the signal line 330 and the antenna 300, obtaining a ratio between the power at the signal line 330 and the power supplied to the antenna 300 as a frequency characteristic.

In Table 3, results obtained by calculating the SAR value and the radiation efficiency are shown. Note that, Comparative Example 1 corresponds to a case where the metal plate 400X larger in size than the antenna 300X is arranged, and Comparative Example 2 of the present invention corresponds to a case where there is no metal plate arranged.

TABLE 3

| | Example 1 | Comparative Example 1 | Comparative Example 2 |
|---|---|---|---|
| SAR value [W/Kg] | 0.8 | 0.016 | 2.16 |
| Radiation efficiency [dB] | −1.3 | −5.5 | −0.04 |

Figure 11A:
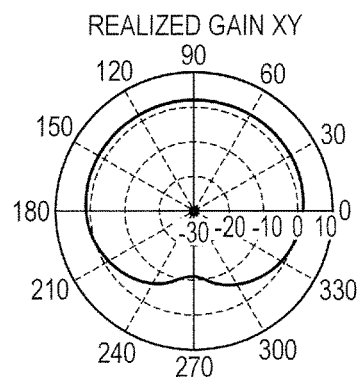
FIG. 11A is a diagram for illustrating directivity of an antenna according to Example 1 of the present invention.
Figure 11B:
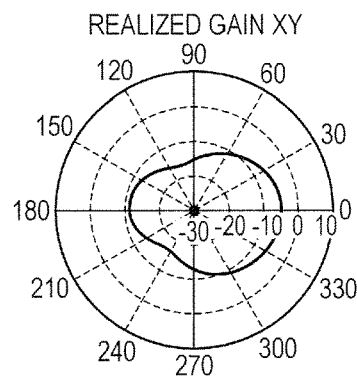
FIG. 11B is a diagram for illustrating directivity of an antenna according to Comparative Example 1 of the present invention.
Figure 11C:
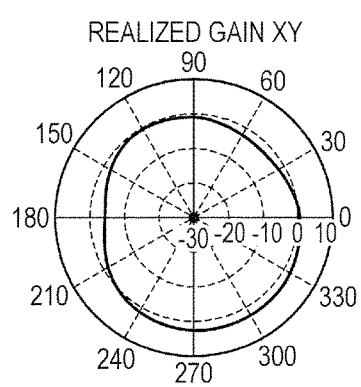
FIG. 11C is a diagram for illustrating directivity of an antenna according to Comparative Example 2 of the present invention.
Figure 11D:
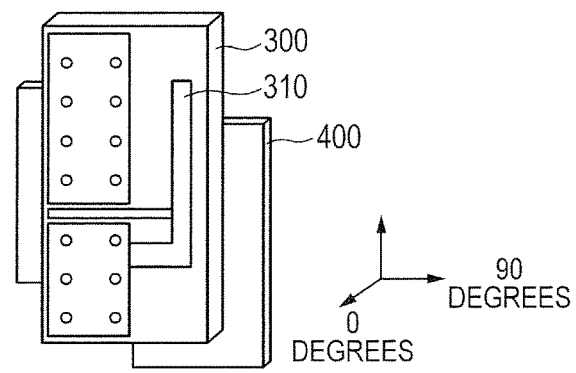
FIG. 11D is a view for illustrating positions where the antenna and the metal plate are arranged according to Example 1.
Figure 12A:
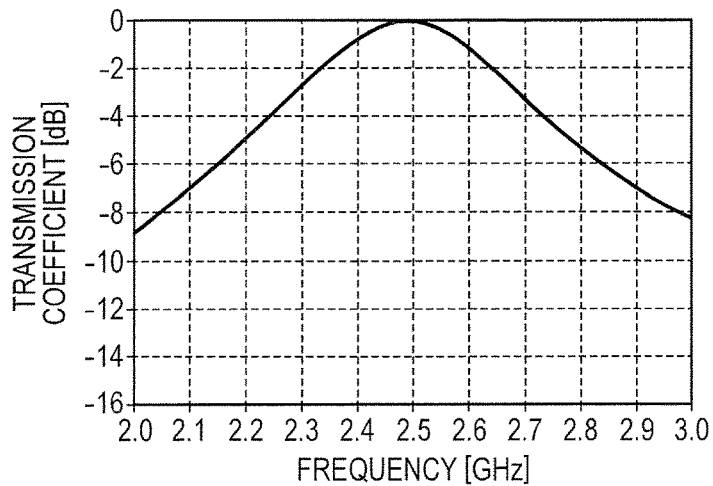
FIG. 12A is a graph for showing a transmission coefficient of the antenna according to Example 1.
Figure 12B:
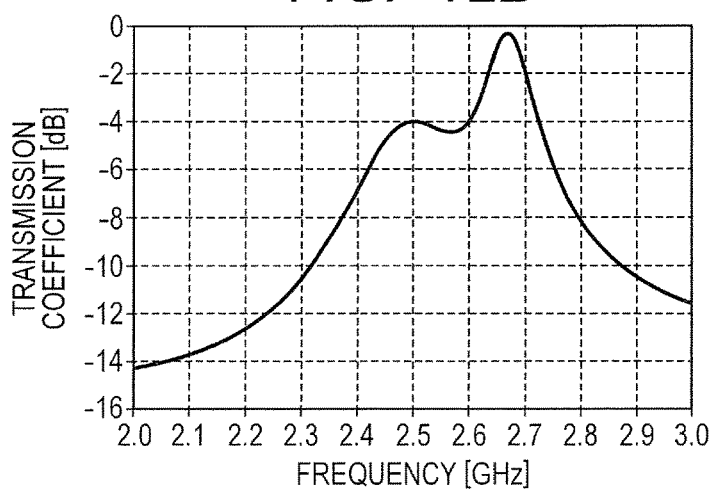
FIG. 12B is a graph for showing a transmission coefficient of the antenna according to Comparative Example 1.
Figure 12C:
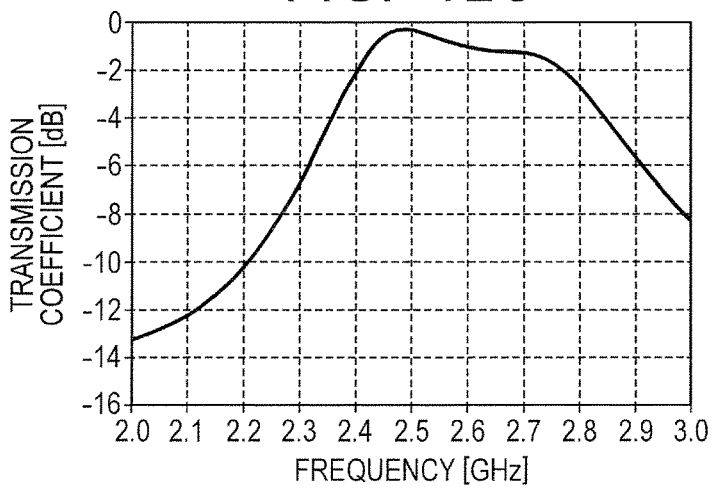
FIG. 12C is a graph for showing a transmission coefficient of the antenna according to Comparative Example 2.

FIG. 11A is a diagram for illustrating directivity of the antenna 300 according to Example 1, FIG. 11B is a diagram for illustrating directivity of the antenna 300 according to Comparative Example 1, and FIG. 11C is a diagram for illustrating directivity of the antenna 300 according to Comparative Example 2. FIG. 11D is a view for illustrating how the antenna 300 and the metal plate 400 are arranged relative to each other according to Example 1. Further, FIG. 12A is a graph for showing a transmission coefficient of the antenna 300 according to Example 1, FIG. 12B is a graph for showing a transmission coefficient of the antenna 300 according to Comparative Example 1, and FIG. 12C is a graph for showing a transmission coefficient of the antenna 300 according to Comparative Example 2.

First, it can be understood from Table 3 that although the SAR value was significantly decreased by applying the metal plate 400X according to Comparative Example 1, the radiation efficiency was significantly decreased from −0.4 [dB] (91[%] of the supplied power was radiated) to −5.5 [dB] (28[%] of the supplied power was radiated).

In contrast, in the configuration of Example 1, the SAR value was decreased from 2.4 to 0.8 while the radiation efficiency was decreased from −0.4 [dB] to −1.3 [dB] (74[%] of the supplied power was radiated) and thus the decrease in radiation efficiency was suppressed.

Now, also in Comparative Example 1, the antenna 300X and the metal plate 400X were arranged relative to each other in the same manner as in how the antenna 300 and the metal plate 400 are arranged relative to each other as illustrated in FIG. 11D, and the directivities of radiated radio waves in directions rotated by 360 degrees with a direction perpendicular to the signal line 330 as its axis are compared with each other.

In the case of Comparative Example 1, as illustrated in FIG. 11B, it can be understood that a radiation amount was decreased in all directions around the antenna 300, and in particular, a radiation amount was significantly decreased in a direction in which the metal plate 400X is arranged. In contrast, in the configuration of Comparative Example 2, as illustrated in FIG. 11C, the antenna 300 radiates the signal wave substantially uniformly in all directions similarly to FIG. 11A.

Next, a factor for decrease in radiation efficiency is described with reference to the transmission coefficients shown in FIG. 12A to FIG. 12C. In Comparative Example 2 in which the metal plate is not arranged, as shown in FIG. 12A, the transmission coefficient had a peak value at the communication frequency of 2.45 [GHz]. In the case of Comparative Example 1, at a frequency of 2.68 [GHz], the metal plate 400X causes a resonance phenomenon due to the potential variation described with reference to FIG. 7A to FIG. 7D, and as shown in FIG. 12B, energy from the signal line 330 was transmitted efficiently at this frequency. As a result of this, little power is supplied to the antenna 300 at the communication frequency of 2.45 [GHz], which decreases the radiation efficiency.

In contrast, in the configuration of Comparative Example 2, as shown in FIG. 12C, although energy was transmitted at around 2.68 [GHz], because the potential variation was suppressed, a resonance phenomenon occurring at a single frequency such as the one occurring in the metal plate 400X in Comparative Example 1 was able to be suppressed. As a result, according to Comparative Example 2, significant decrease in power supplied to the antenna 300 at the communication frequency of 2.45 [GHz] is prevented.

It can be understood from the above-mentioned results that according to Example 1, the SAR value was decreased while the decrease in communication performance (directivity and radiation efficiency) was suppressed at the same time.

Next, a position where the metal plate 400 is arranged and definition of dimensions of the metal plate 400 are described. Note that, the dimensions of the antenna 300 are as illustrated in FIG. 8A and FIG. 8B and shown in Table 2.

The metal plate 400 is arranged in order to decrease the SAR value, and hence as shown in Table 3, the SAR value is decreased as the size of the metal plate 400 becomes larger relative to the antenna 300. On the other hand, the arrangement of the metal plate 400 inhibits propagation of radio waves from the antenna 300, and hence the communication performance is further prevented from being decreased as the size of the metal plate 400 becomes smaller relative to the antenna 300. In other words, a lower limit of the dimensions of the metal plate 400 mainly relates to an effect of decreasing the SAR value, and an upper limit thereof mainly relates to prevention of decrease in communication performance.

Note that, a threshold of the SAR value was set to 1.6 [W/kg], which is the international standard. It is therefore preferred that the SAR value be 1.6 [W/kg], which is the threshold, or less. Further, in terms of the communication performance, an effect is achieved when the radiation efficiency is improved to be larger than −5.5 [dB] described in Comparative Example 1, which is the related art. In this Example, the dimensions of the metal plate are described by setting, as thresholds, values of −2.5 [dB] (56[%] of the supplied power is radiated), which corresponds to an amount of a two-fold improvement, and −0.75 [dB] (84[%] of the supplied power is radiated), which corresponds to an amount of a three-fold improvement.

Figure 13A:
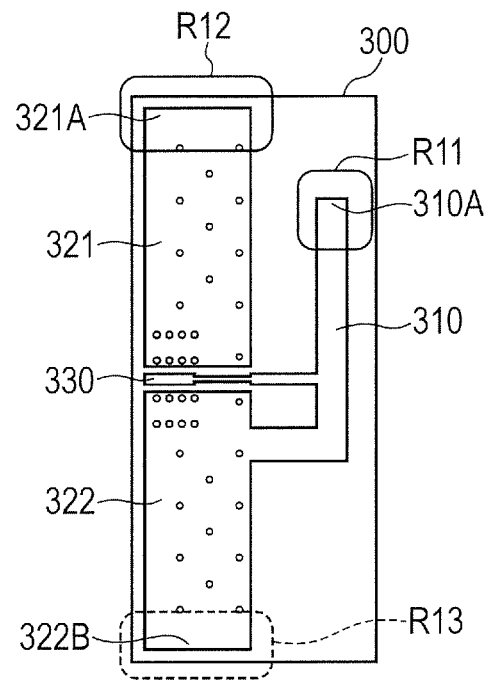
FIG. 13A is a view for illustrating regions where the electric field is strong.
Figure 13B:
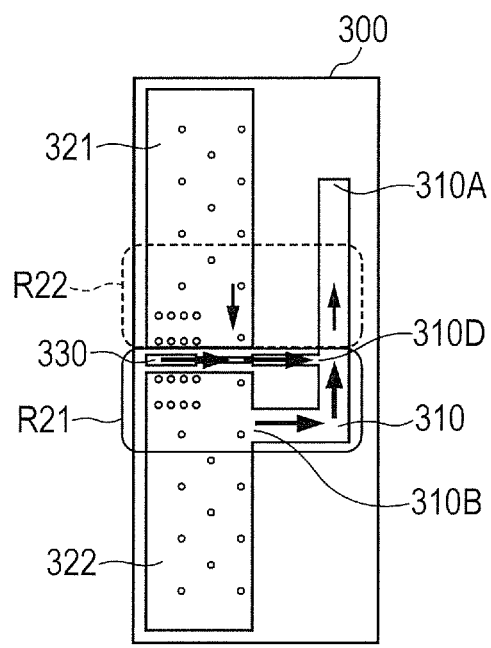
FIG. 13B is a view for illustrating regions where the magnetic field is strong.

FIG. 13A is a view for illustrating regions where the electric field is strong, and FIG. 13B is a view for illustrating regions where the magnetic field is strong. In FIG. 13A, regions R11 and R12 where the electric field is the strongest (the electric field strength is the largest) are indicated by the solid lines, and a region R13 where the electric field is the second strongest is indicated by the broken line.

The region R11 is a region including the one end portion 310A of the antenna element 310 and the vicinity thereof when viewed in the arrow Y direction, and the region R12 is a region including the end portion 321A of the ground pattern 321 and the vicinity thereof when viewed in the arrow Y direction. Further, the region R13 is a region including the end portion 322B of the ground pattern 322 and the vicinity thereof.

Further, in FIG. 13B, a region R21 where the magnetic field is the strongest (the magnetic field strength is the largest) is indicated by the solid line, and a region R22 where the magnetic field is the second strongest is indicated by the broken line. Further, the direction of current is indicated by the arrows in FIG. 13B. The region R22 is a region closer to the one end portion 310A of the antenna element 310 in the arrow Z direction as compared with the region R21. It is effective when the area and the arrangement position of the metal plate 400 are set such that the metal plate 400 does not shield the regions R11, R12, and R13 illustrated in FIG. 13A and shields the regions R21 and R22 illustrated in FIG. 13B.

Experimental Example 1-1

Figure 14:
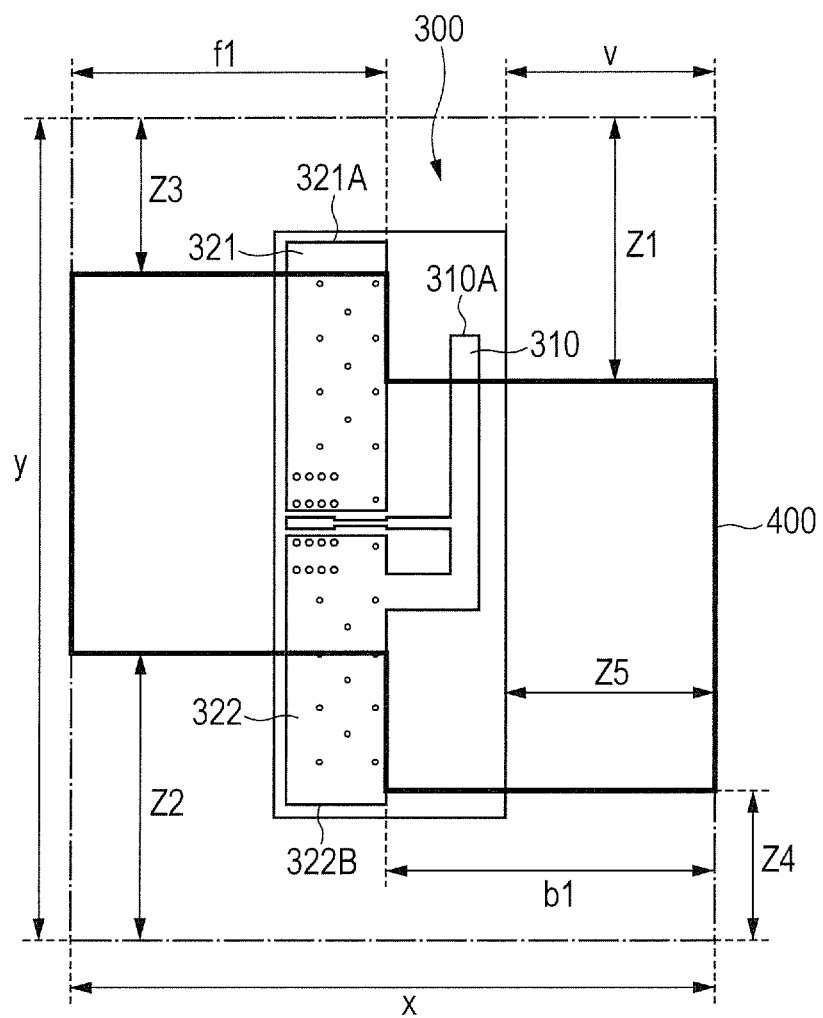
FIG. 14 is an external view for illustrating a calculation model for the metal plate and the antenna according to Example 1.

FIG. 14 is an external view for illustrating a calculation model for the metal plate and the antenna according to Example 1. As illustrated in FIG. 14, in the metal plate 400, cutouts are formed on the one end portion 310A side of the antenna element 310, the end portion 321A side of the ground pattern 321, and the end portion 322B side of the ground pattern 322. A cutout length of the cutout formed on the one end portion 310A side of the antenna element 310 in the arrow Z direction is represented by Z1. A cutout length of the cutout formed on the end portion 321A side of the ground pattern 321 in the arrow Z direction is represented by Z3. A cutout length of the cutout formed on the end portion 322B side of the ground pattern 322 in the arrow Z direction is represented by Z2. A cutout length of a cutout formed on the side opposite to the one end portion 310A of the antenna element 310 in the arrow Z direction is represented by Z4.

As described above, the regions of the antenna 300 where the electric field is strong are the one end portion 310A that is the open end portion of the antenna element 310 and both end portions of the ground patterns, namely, the end portions 321A and 322B, where impedance is high. Decrease in communication performance can be prevented by avoiding arranging the metal plate 400 above those regions.

Figure 15A:
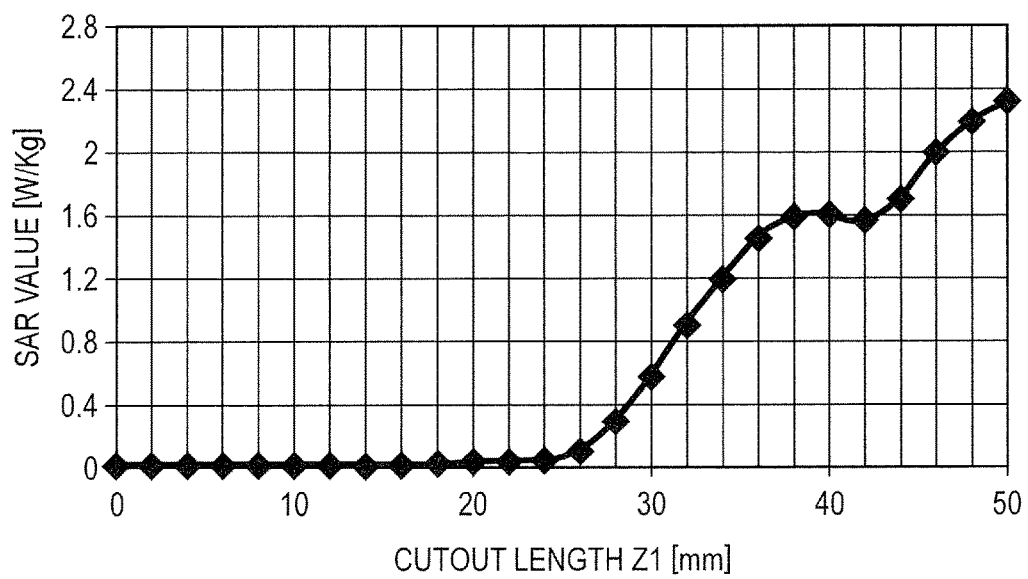
FIG. 15A is a graph for showing a SAR value obtained when Z1 was changed in the calculation model of FIG. 14.
Figure 15B:
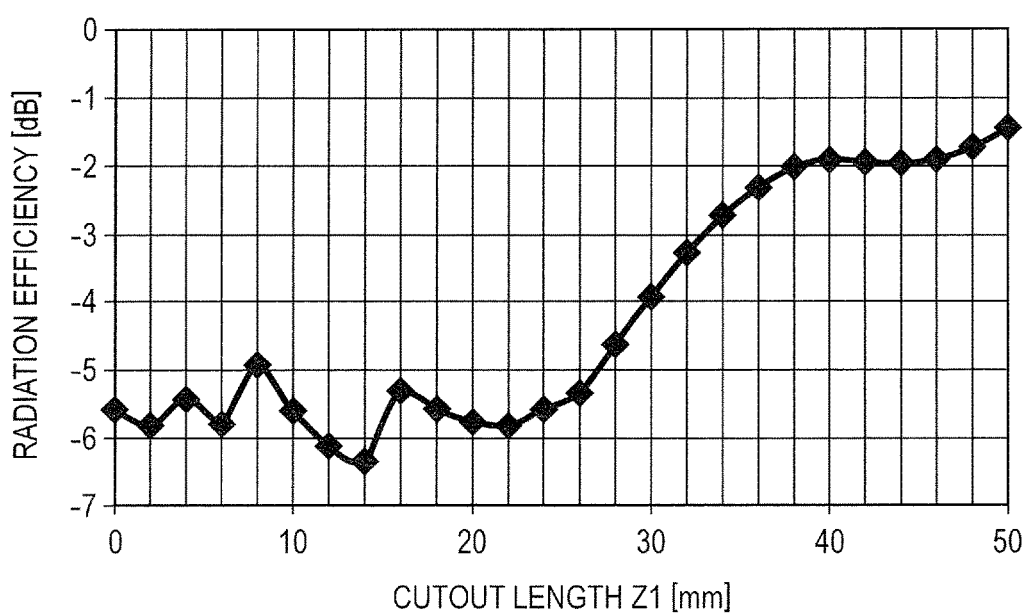
FIG. 15B is a graph for showing radiation efficiency obtained when Z1 was changed in the calculation model of FIG. 14.

FIG. 15A is a graph for showing a SAR value obtained when Z1 was changed in the calculation model of FIG. 14. FIG. 15B is a graph for showing radiation efficiency obtained when Z1 was changed in the calculation model of FIG. 14.

In FIG. 15A and FIG. 15B, simulation results obtained when, in the metal plate 400 illustrated in FIG. 14, Z1 was changed under a state in which Z2, Z3, and Z4 were each set to 0 [mm] and Z5 was set to 15 [mm]. An area of the cutout on the one end portion 310A side of the antenna element 310 is determined by the dimension Z1 and a dimension b1. When the SAR value is evaluated in terms of its threshold, as shown in FIG. 15A, the SAR value is the threshold of 1.6 [W/Kg] or less when the dimension Z1 is 38 [mm] or less. A point where Z1=38 [mm] is a point where a distance from the one end portion 310A that is the open end portion of the antenna element 310 is about 14 [mm]. The length of the antenna element 310 is 28.85 [mm], and the point where Z1=38 [mm] corresponds to a distance of about a half of the antenna element length. In the antenna element 310, the magnetic field is strong on the side where the ground pattern 322 and the antenna element 310 are connected, and the magnetic field strength attenuates with a decreasing distance from the one end portion 310A. In order to decrease the SAR value to be the standard value or less, Z1 needs to be set to 38 [mm], which corresponds to the intermediate point of the antenna element length, or less. Further, as shown in FIG. 15B, the radiation efficiency starts to be improved steeply when Z1 becomes 24 [mm], where one side of the metal plate 400 overlaps the one end portion of the antenna element 310, or more. When the dimension Z1 is 35 [mm] or more, the radiation efficiency becomes −2.5 [dB], which corresponds to an amount of a two-fold improvement. With the area of the cutout determined by the dimension Z1 and the dimension b1, an effect of improving the radiation efficiency threefold cannot be obtained.

In summary, when the cutout is formed in the metal plate 400 with the dimension Z1 falling within a range of 35 [mm] or more and 38 [mm] or less, the SAR value can be decreased while the communication performance is improved twofold at the same time.

Experimental Example 1-2

Figure 16A:
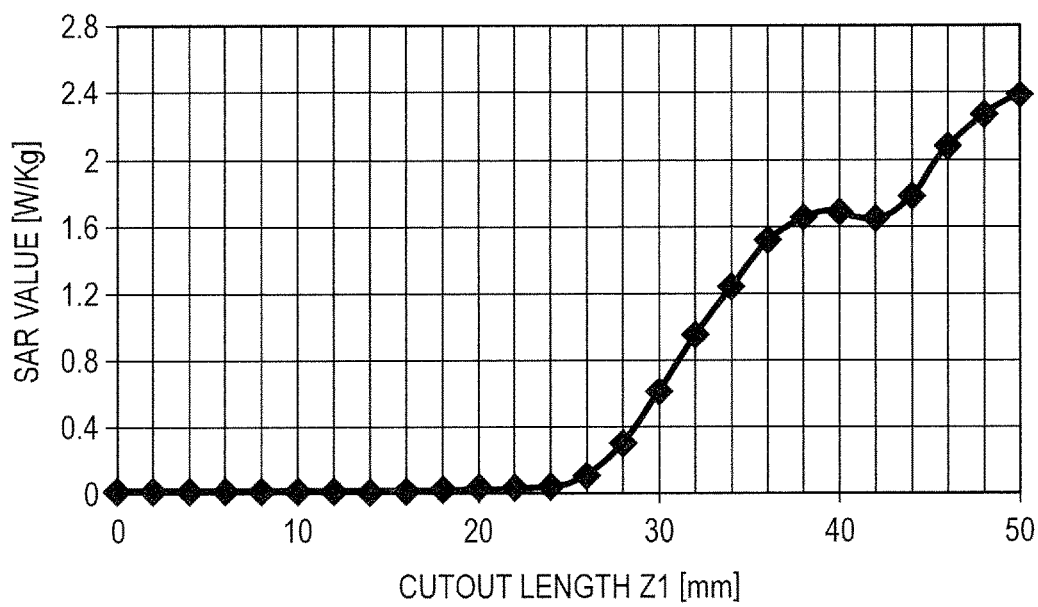
FIG. 16A is a graph for showing a SAR value obtained when a value of Z4 was set to 15 [mm] and Z1 was changed in the calculation model of FIG. 14.
Figure 16B:
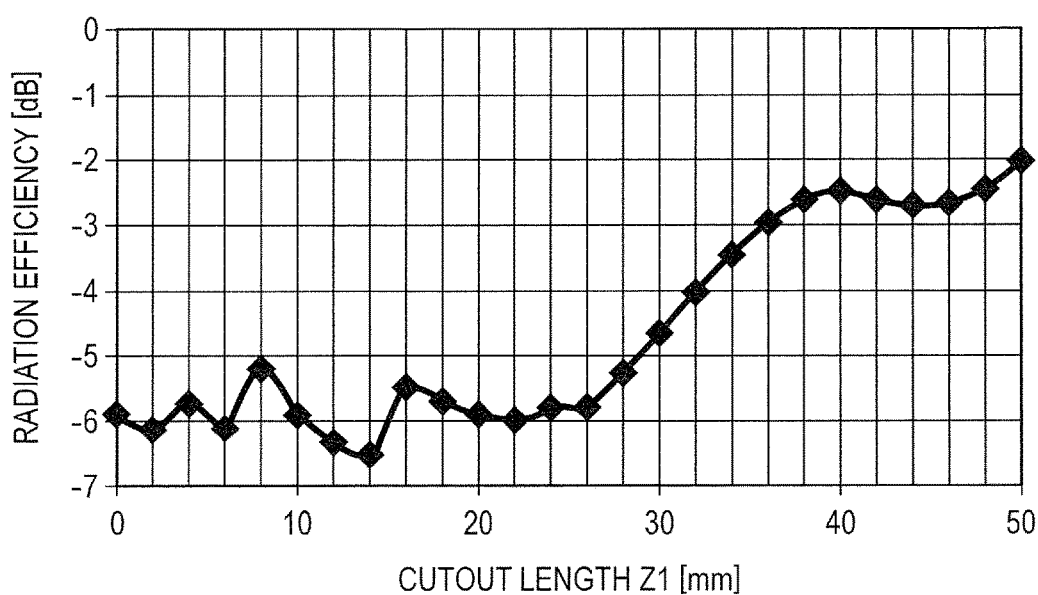
FIG. 16B is a graph for showing radiation efficiency obtained when the value of Z4 was set to 15 [mm] and Z1 was changed in the calculation model of FIG. 14.

Next, a SAR value obtained when the cutout length Z1 was changed under a state in which the cutout whose area is determined by Z4=15 [mm] and b1 was formed in FIG. 14 is shown in FIG. 16A, and the radiation efficiency obtained in this case is shown in FIG. 16B. In other words, FIG. 16A is a graph for showing a SAR value obtained when the value of Z4 was set to 15 [mm] and Z1 was changed in the calculation model of FIG. 14, and FIG. 16B is a graph for showing radiation efficiency obtained when the value of Z4 was set to 15 [mm] and Z1 was changed in the calculation model of FIG. 14. As shown in FIG. 16A, similarly to FIG. 15A, the SAR value is the threshold of 1.6 [W/Kg] or less when the dimension Z1 is 38 [mm] or less. The radiation efficiency starts to be improved steeply when Z1 becomes 24 [mm], where one side of the metal plate 400 overlaps the one end portion 310A of the antenna element 310, or more. From those results, it follows that even when the cutout is formed on the side opposite to the one end portion 310A of the antenna element 310, the SAR value and the radiation efficiency are not affected by the formed cutout.

Experimental Example 2

Figure 17A:
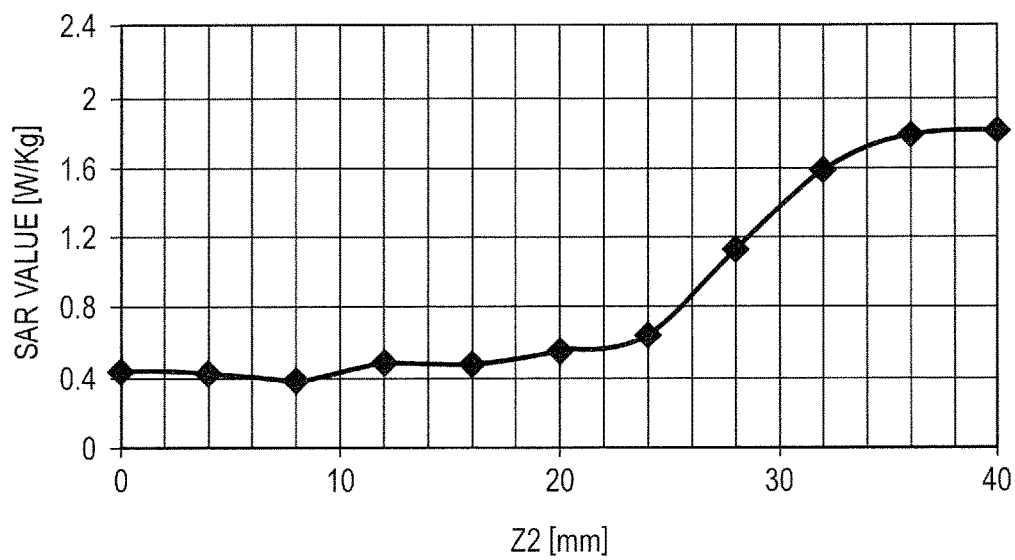
FIG. 17A is a graph for showing a SAR value obtained when Z2 was changed in the calculation model of FIG. 14.
Figure 17B:
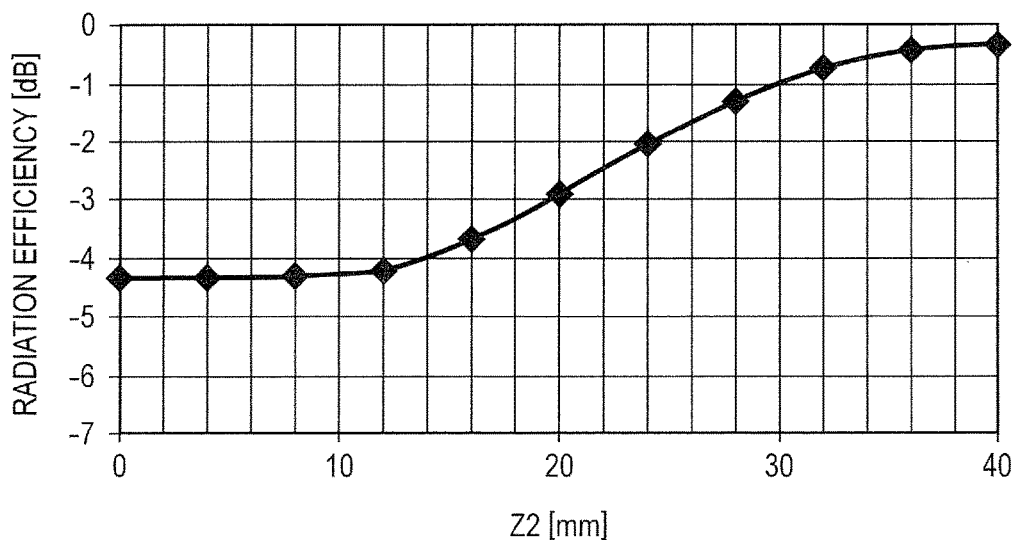
FIG. 17B is a graph for showing radiation efficiency obtained when Z2 was changed in the calculation model of FIG. 14.

FIG. 17A is a graph for showing a SAR value obtained when Z2 was changed in the calculation model of FIG. 14. FIG. 17B is a graph for showing radiation efficiency obtained when Z2 was changed in the calculation model of FIG. 14.

In FIG. 17A and FIG. 17B, simulation results obtained when, in the metal plate 400 illustrated in FIG. 14, Z2 was changed under a state in which Z1, Z3, Z4, and Z5 were set to 29.1 [mm], 0 [mm], 0 [mm], and 15 [mm], respectively. An area of the cutout on the end portion 322B side of the ground pattern 322 is determined by the dimension Z2 and the dimension f1. The cutout whose area is determined by the dimension Z1 is formed, and hence when Z2 is 0 [mm], the SAR value is decreased, although by a slight amount, to 0.4 [W/Kg]. When Z2 is 0 [mm], the radiation efficiency is −4.2 [dB], and hence an effect of improving the radiation efficiency, although by a slight amount, was obtained. When the SAR value is evaluated in terms of its threshold, as shown in FIG. 17A, the SAR value is the threshold of 1.6 [W/Kg] or less when the dimension Z2 is 32 [mm] or less. A point where Z2=32 [mm] corresponds to the portion where the antenna element 310 and the ground pattern 322 are connected, which is the region where the magnetic field is strong. When the number of formed cutouts is two, this point corresponds to an upper limit of Z2. Further, as shown in FIG. 17B, the radiation efficiency starts to be improved when Z2 becomes 15 [mm], where one side of the metal plate 400 overlaps the end portion 322B of the ground pattern 322, or more. When the dimension Z2 becomes 22 [mm] or more, the radiation efficiency becomes −2.5 [dB], which corresponds to an amount of a two-fold improvement. Further, when the dimension Z2 becomes 32 [mm] or more, the radiation efficiency becomes −0.75 [dB], which corresponds to an amount of a three-fold improvement.

In summary, when the cutout is formed in the metal plate 400 with the dimension Z2 falling within a range of 22 [mm] or more and 32 [mm] or less, the SAR value can be decreased while the communication performance is improved twofold at the same time. Further, it can be understood that when the cutout is formed in the metal plate 400 with the dimension Z2 set to 32 [mm], the SAR value can be decreased while the communication performance is improved threefold at the same time. Comparing the shapes with each other with which an effect of improving the radiation efficiency twofold or more can be obtained, in the shape where one cutout is formed as in the case of FIG. 16A and FIG. 16B, a range between a lower limit and an upper limit is 3 [mm]. In contrast, in the shape where two cutouts are formed as in the case of FIG. 17A and FIG. 17B, a range between a lower limit and an upper limit is 10 [mm], and hence it can be understood that the degree of freedom in shape is enhanced.

Experimental Example 3

Figure 18A:
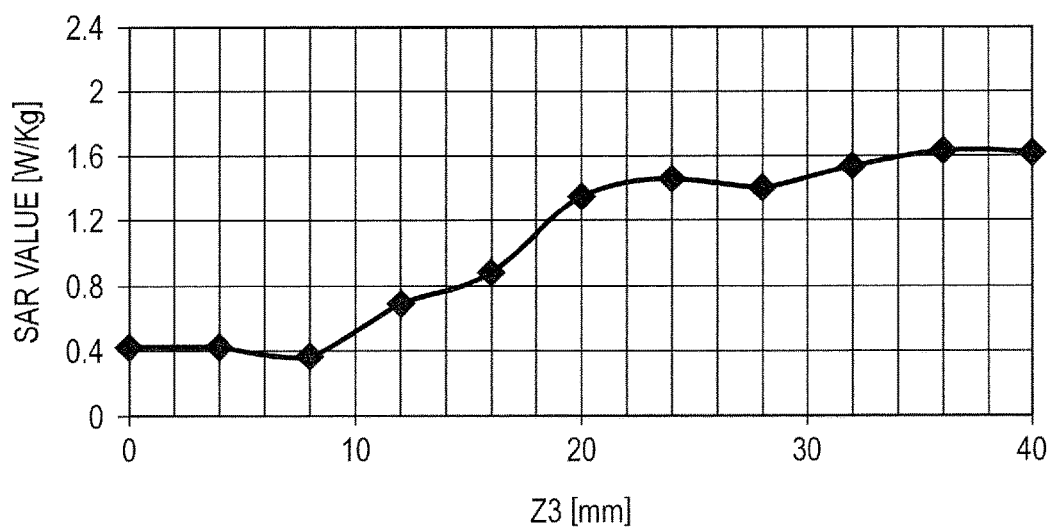
FIG. 18A is a graph for showing a SAR value obtained when Z3 was changed in the calculation model of FIG. 14.

FIG. 18A is a graph for showing a SAR value obtained when Z3 was changed in the calculation model of FIG. 14.

Figure 18B:
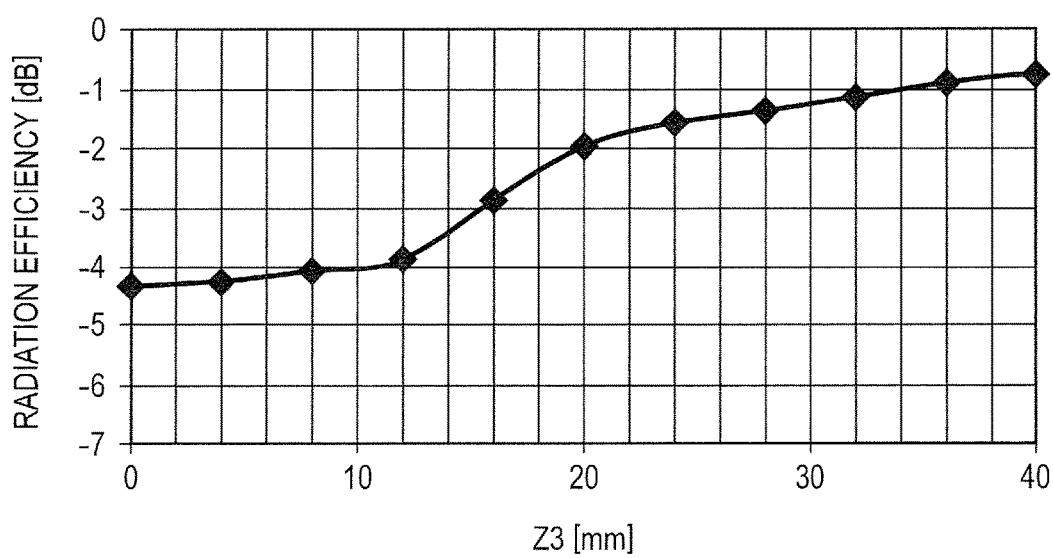
FIG. 18B is a graph for showing radiation efficiency obtained when Z3 was changed in the calculation model of FIG. 14.

FIG. 18B is a graph for showing radiation efficiency obtained when Z3 was changed in the calculation model of FIG. 14.

In FIG. 18A and FIG. 18B, simulation results obtained when, in the metal plate 400 illustrated in FIG. 14, Z3 was changed under a state in which the dimensions Z1, Z2, Z4, and Z5 were set to 29.1 [mm], 0 [mm], 0 [mm], and [mm], respectively. An area of the cutout on the end portion 321A side of the ground pattern 321 is determined by the dimension Z3 and the dimension f1. When the SAR value is evaluated in terms of its threshold, as shown in FIG. 18A, the SAR value is the threshold of 1.6 [W/Kg] or less when the dimension Z3 is 35 [mm] or less. Similarly to FIG. 15A and FIG. 15B, at a point where Z1=Z3=38 [mm], the distance from the one end portion 310A of the antenna element 310 is about 14 [mm], which is about a half of the length of the antenna element 310. In order to decrease the SAR value to be the standard value or less, Z3 needs to be set to 38 [mm], which corresponds to the intermediate point of the antenna element 310, or less. In FIG. 18A and FIG. 18B, a slight amount of error, in which Z3 needs to be set to 35 [mm] or less in order to achieve the standard value, occurs as a result of forming the cutouts in both of the portions of Z1 and Z3, but Z3 needs to be set to the intermediate point or less similarly to FIG. 15A and FIG. 15B. Further, as shown in FIG. 18B, the radiation efficiency starts to be improved when Z3 becomes 15 [mm], where one side of the metal plate 400 overlaps the end portion 321A of the ground pattern 321, or more. When the dimension Z3 becomes 18 [mm] or more, the radiation efficiency becomes −2.5 [dB], which corresponds to an amount of a two-fold improvement. Further, when the dimension Z3 becomes 38 [mm] or more, the radiation efficiency becomes −0.75 [dB], which corresponds to an amount of a three-fold improvement.

In summary, when the cutout is formed in the metal plate 400 with the dimension Z3 falling within a range of 18 [mm] or more and 34 [mm] or less, the SAR value can be decreased while the communication performance is improved twofold at the same time. Further, with the area of the cutout determined by the dimension Z3 and the dimension f1, an effect of improving the radiation efficiency threefold cannot be obtained. Comparing the shapes with each other with which an effect of improving the radiation efficiency twofold or more can be obtained, in the shape where one cutout of the portion of Z2 is formed as in the case of FIG. 17A and FIG. 17B, a range between a lower limit and an upper limit is 10 [mm]. In contrast, in the shape where two cutouts of the portion of Z3 are formed as in the case of FIG. 18A and FIG. 18B, a range between a lower limit and an upper limit is 16 [mm], and hence it can be understood that the degree of freedom in shape is enhanced.

Experimental Example 4

Figure 19A:
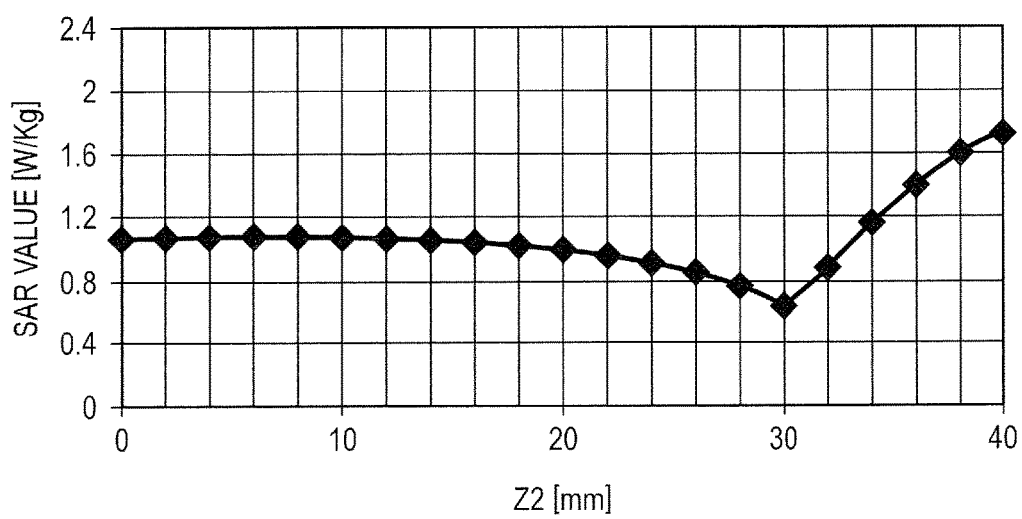
FIG. 19A is a graph for showing a SAR value obtained when Z2 was changed in the calculation model of FIG. 14.
Figure 19B:
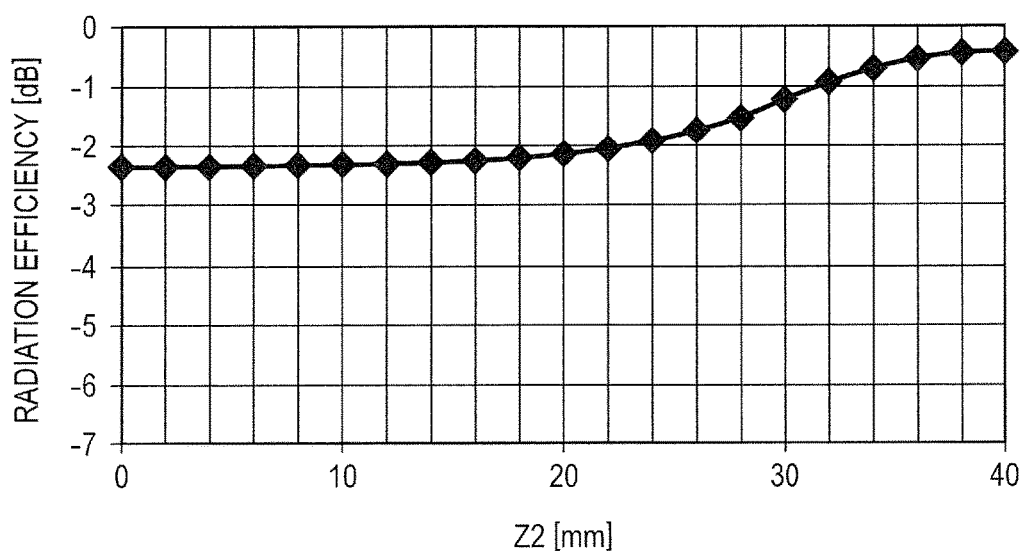
FIG. 19B is a graph for showing radiation efficiency obtained when Z2 was changed in the calculation model of FIG. 14.

FIG. 19A is a graph for showing a SAR value obtained when Z2 was changed in the calculation model of FIG. 14. FIG. 19B is a graph for showing radiation efficiency obtained when Z2 was changed in the calculation model of FIG. 14.

In FIG. 19A and FIG. 19B, simulation results obtained when, in the metal plate 400 illustrated in FIG. 14, Z2 was changed under a state in which the dimensions Z1, Z3, Z4, and Z5 were set to 29.1 [mm], 17.1 [mm], 0 [mm], and 15 [mm], respectively. An area of the cutout on the end portion 322B side of the ground pattern 322 is determined by the dimension Z2 and the dimension f1. When the SAR value is evaluated in terms of its threshold, as shown in FIG. 19A, the SAR value is the threshold of 1.6 [W/Kg] or less when the dimension Z2 is 38 [mm] or less. In this connection, when three cutouts are formed, it can be understood that the portion of Z2 can be cut out to a further extent as compared with the case of FIG. 18A and FIG. 18B where two cutouts are formed. The SAR value is proportional to a propagation amount of the magnetic field, and becomes larger when the magnetic field propagates in a locally-concentrated manner. When two cutouts are formed, the magnetic field propagates while being concentrated on the sides where the cutouts are formed, and hence it is necessary to cover both of the portion where the antenna element 310 and the ground pattern 322 are connected and the signal line 330. In contrast, when three cutouts are formed, the magnetic field propagates from the cutout of the portion of Z3, and hence when the SAR values are compared at Z2=15 [mm] in FIG. 17A and FIG. 17B and FIG. 19A and FIG. 19B, the SAR value is higher when three cutouts are formed. Further, when the cutout is formed on the Z2 side, it can be understood that the local concentration of the magnetic field does not occur because the magnetic field propagates from both of the portions of Z3 and Z2, and the SAR value is the threshold or less as long as only the signal line 330 is covered. Further, as shown in FIG. 19B, when the dimension Z2 becomes 0 [mm] or more, the radiation efficiency becomes −2.5 [dB], which corresponds to an amount of a two-fold improvement. Still further, when the dimension Z2 becomes 33 [mm] or more, the radiation efficiency becomes −0.75 [dB], which corresponds to an amount of a three-fold improvement.

In summary, when the cutout is formed in the metal plate 400 with the dimension Z2 falling within a range of 0 [mm] or more and 38 [mm] or less, the SAR value can be decreased while the communication performance is improved twofold at the same time. Further, when the cutout is formed in the metal plate 400 with the dimension Z2 falling within a range of 33 [mm] or more and 38 [mm] or less, the SAR value can be decreased while the communication performance is improved threefold at the same time. Comparing the shapes with each other with which an effect of improving the radiation efficiency threefold or more can be obtained, in the shape where the cutout of the portion of Z2 is formed as in the case of FIG. 17A and FIG. 17B, a range between a lower limit and an upper limit is 0 [mm]. In contrast, in the shape where three cutouts are formed as in the case of FIG. 19A and FIG. 19B, a range between a lower limit and an upper limit is 5 [mm], and hence it can be understood that the degree of freedom in shape is enhanced.

Note that, in FIG. 4, the sides 402, 403, and 406 of the metal plate 400 relate to positions where the magnetic field is strong in terms of the SAR value. Accordingly, the SAR value is decreased as the size of the metal plate 400 becomes larger.

Experimental Example 5

Figure 20:
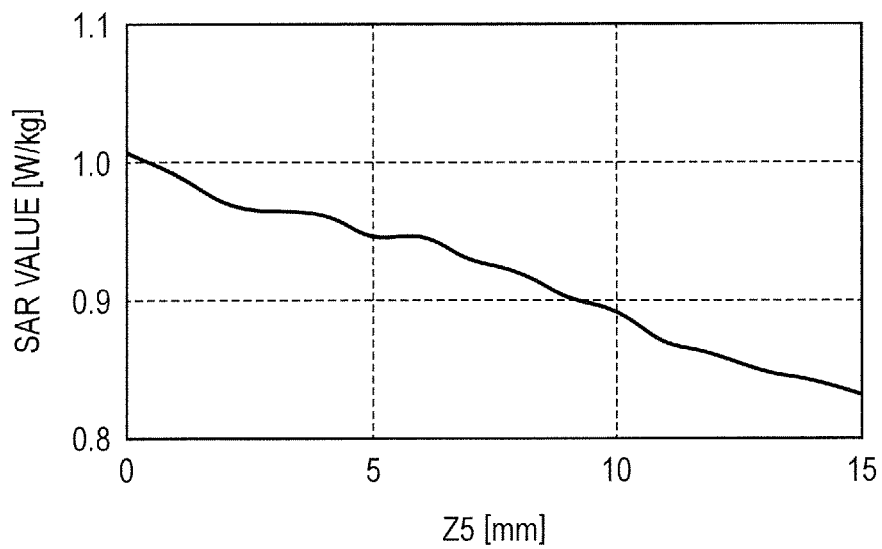
FIG. 20 is a graph for showing a SAR value obtained when Z5 was changed in the calculation model of FIG. 14.

FIG. 20 is a graph for showing a SAR value obtained when Z5 was changed in the calculation model of FIG. 14. Specifically, FIG. 20 is a graph for showing a SAR value obtained when the dimensions Z1, Z2, Z3, and Z4 were set to 29.1 [mm], 28 [mm], 15 [mm], and 0 [mm], respectively, and the dimension Z5 is changed within a range of from 0 [mm] to 15 [mm] in the metal plate 400 illustrated in FIG. 14. As shown in FIG. 20, it can be understood that the SAR value is decreased as the dimension Z5 becomes larger.

Considering the actual application of the metal plate 400 in the wireless communication apparatus 201, a lower limit of the dimension of the metal plate 400 in the arrow X direction is set to a distance from the end portion of the antenna element 310 in the arrow X direction to the end portion of the ground patterns 321 and 322 in the arrow X direction, and an upper limit thereof is set to twice the distance.

Second Embodiment

Figure 21:
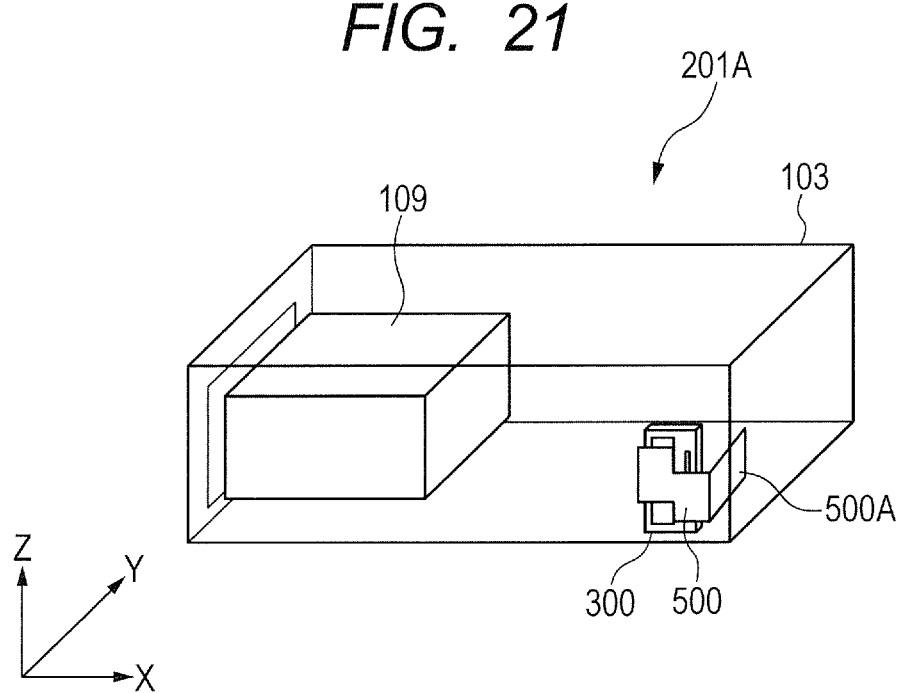
FIG. 21 is a transparent view for illustrating a schematic configuration of a wireless communication apparatus according to a second embodiment of the present invention.

Next, a wireless communication apparatus according to a second embodiment of the present invention is described. FIG. 21 is a transparent view for illustrating a schematic configuration of the wireless communication apparatus according to the second embodiment of the present invention. Note that, the same components as those described in the first embodiment are denoted by the same reference symbols, and descriptions thereof are omitted.

A wireless communication apparatus 201A includes the exterior housing 103, and the antenna 300, a metal plate 500 having a plate shape and serving as the blocking member, and the battery 109, which are arranged inside the exterior housing 103.

Figure 22A:
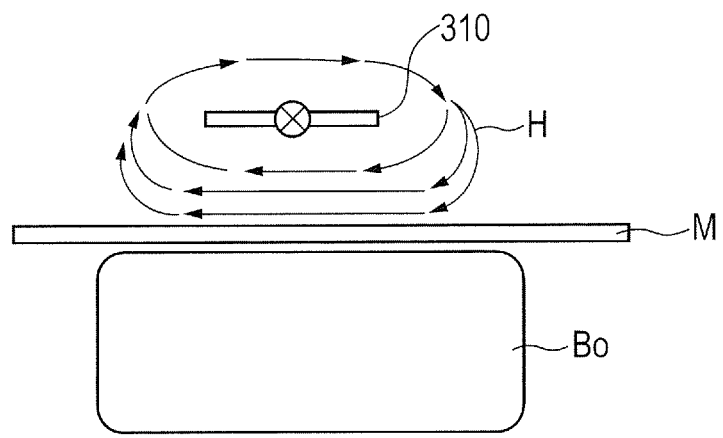
FIG. 22A is a diagram for illustrating a magnetic field distribution obtained when an end portion of the metal plate is not folded.
Figure 22B:
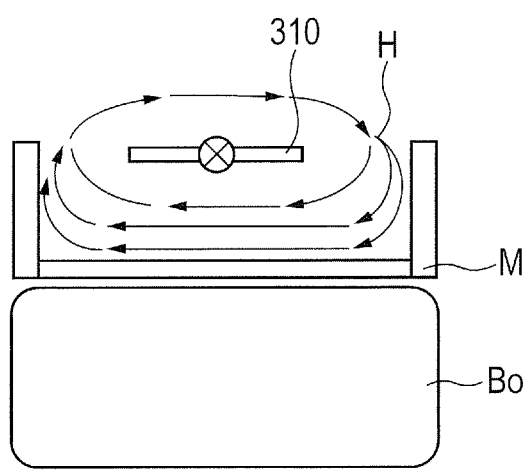
FIG. 22B is a diagram for illustrating a magnetic field distribution obtained when the end portion of the metal plate is folded.

FIG. 22A and FIG. 22B are conceptual diagrams for illustrating current flowing through the antenna element 310 and a magnetic field distribution in the vicinity of the antenna element 310. FIG. 22A is a diagram for illustrating a magnetic field distribution between the antenna element 310 and the human body Bo obtained when the end portion of the metal plate M is not folded. FIG. 22B is a diagram for illustrating a magnetic field distribution between the antenna element 310 and the human body Bo obtained when the end portion of the metal plate M is folded.

In the above description of the embodiment, for the sides 402, 403, and 406 illustrated in FIG. 4, the SAR value is decreased as their dimensions become larger. This is because, with the magnetic field distribution illustrated in FIG. 6C, as the dimensions of the metal plate are made larger as illustrated in FIG. 22A, the amount of the magnetic field leaking from the end portion of the metal plate M to the human body Bo is decreased.

However, due to a limitation of the dimensions of the exterior housing 103 of the wireless communication apparatus, the metal plate having large dimensions cannot be arranged in the exterior housing 103 in some cases. In view of this, in the second embodiment, in order to decrease the amount of the magnetic field leaking from the end portion of the metal plate 500 to the human body Bo, as illustrated in FIG. 22B, an end portion 500A of the metal plate 500 is folded toward the antenna 300 side so as to surround ends of the antenna 300. With this structure, the area of the metal plate 500 can be reduced while the SAR value is decreased at the same time.

Figure 23A:
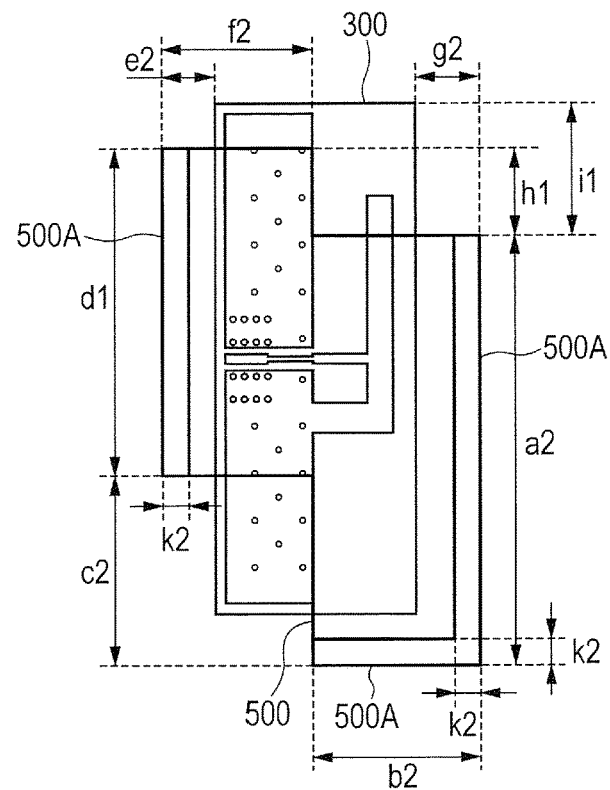
FIG. 23A is a plan view for illustrating how the antenna and the metal plate are arranged relative to each other in FIG. 21.
Figure 23B:
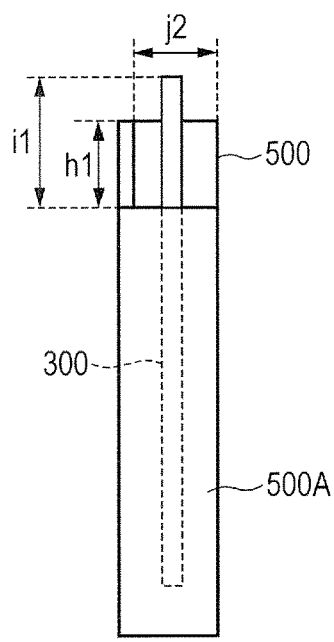
FIG. 23B is a side view for illustrating how the antenna and the metal plate are arranged relative to each other in FIG. 21.

FIG. 23A is a plan view for illustrating how the antenna 300 and the metal plate 500 are arranged relative to each other in FIG. 21. FIG. 23B is a side view for illustrating how the antenna 300 and the metal plate 500 are arranged relative to each other in FIG. 21. FIG. 23A and FIG. 23B are external views for illustrating the metal plate 500 formed by changing the dimensions of the metal plate 400 of FIG. 9 to form a folded structure having a height j2 and a thickness k2 in each of the sides 402, 403, and 406 of the metal plate 400 illustrated in FIG. 4. In Table 4, the dimensions of this calculation model are shown.

TABLE 4

| | Reference symbol of FIG. 23A and FIG. 23B | | | | | | | |
|---|---|---|---|---|---|---|---|---|
| | a2 | b2 | c2 | e2 | f2 | g2 | j2 | k2 |
| Dimension (mm) | 42.3 | 15.7 | 21.5 | 5.5 | 15.1 | 5.5 | 3.4 | 0.5 |

For comparison, results of the SAR value obtained when the metal plate formed under the conditions of FIG. 9 and Table 2, the metal plate formed under the conditions of FIG. 21, and the metal plate formed under the conditions of FIG. 21 and having a shape obtained by removing the folded structure were arranged are shown in Table 5.

TABLE 5

| | Metal plate of FIG. 9 | Metal plate of FIG. 21 | Metal plate of FIG. 21 without folded structure |
|---|---|---|---|
| SAR value [W/Kg] | 0.8 | 0.88 | 1.0 |

It can be understood from those results that even when the area of the metal plate is small, the SAR value can be reduced by forming the folded structure.

Other Embodiments

Note that, the present invention is not limited to the embodiments described above, and can be modified in various ways within the technical idea of the present invention.

In the embodiments described above, the metal plate having a quadrilateral shape is cut out to form the metal plate 400 or 500, and the dimensions of the cutout are determined with the use of the same coordinate system as that of the antenna element 310 and the ground patterns 321 and 322. However, the present invention is not limited to this configuration.

Figure 24A:
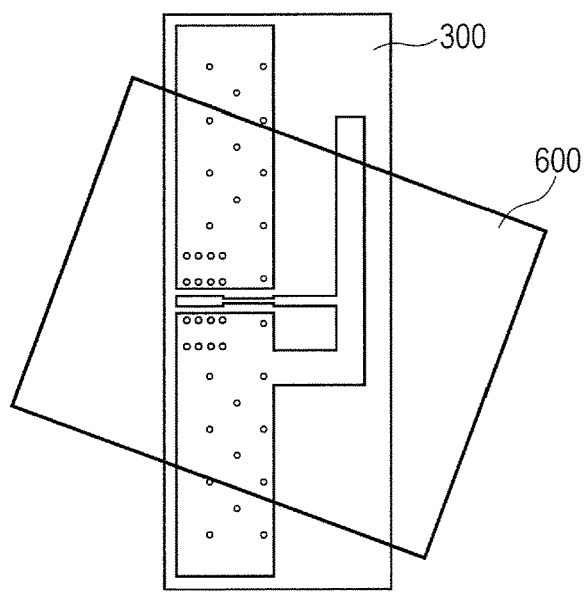
FIG. 24A is an explanatory view for illustrating a (first) modification example of the metal plate.
Figure 24B:
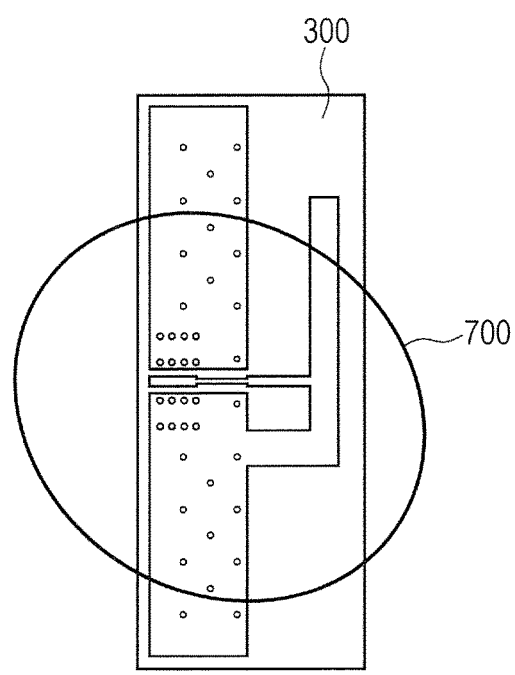
FIG. 24B is an explanatory view for illustrating a (second) modification example of the metal plate.

FIG. 24A and FIG. 24B are explanatory views for illustrating modification examples of the metal plate. As illustrated in FIG. 24A, a metal plate 600 having a rectangular shape may be arranged diagonally with respect to the antenna 300. As another example, as illustrated in FIG. 24B, a metal plate 700 having a circle shape may be adopted. Further, although a surface of the metal plate 400 from which the SAR value is measured is only one side in the above description, for example, when the SAR value is high also in the direction of the external connector 108, the metal plate may have a three-dimensional shape in which the metal plate 600 or 700 is folded on the connector side similarly to the metal plate 500.

Further, in the embodiments described above, the case is described where the IC 105 serving as the wireless device is connected to the antenna 300, and the signal wave is transmitted via the antenna 300, but the present invention is not limited to this case. The wireless device may be further configured to be capable of transmitting/receiving the signal wave via the antenna 300.

Further, in the embodiments described above, the case is described where the antenna 300 is the inverted F antenna, but the present invention is not limited to this case. The antenna may be, for example, a monopole antenna or an inverted L antenna. In this case, the one end portion of the antenna element is opened, and a pair of signal cables extending from the wireless device is connected between the another end portion of the antenna element and the ground conductor.

Further, in the embodiments described above, the case is described where the ground conductor 320 is divided into the ground pattern 321 and the ground pattern 322, but the present invention is not limited to this case. The ground pattern may be the one in which the ground pattern 321 and the ground pattern 322 are integrally formed. In this case, the ground pattern 323 (and the vias 324) may be omitted.

Further, in the embodiments described above, the case is described where the antenna is formed of the printed wiring board, but the present invention is not limited to this case. For example, the antenna may be formed into a three-dimensional shape by folding the metal plate.

Further, in the embodiments described above, the image pickup apparatus is described as an example of the electronic apparatus, but the present invention is not limited thereto. The present invention is applicable to any electronic apparatus having the wireless communication apparatus mounted thereto.

According to the present invention, it is possible to decrease a SAR value while decreasing a bias of directivity of an electromagnetic wave in an antenna and enhancing radiation efficiency of the electromagnetic wave at a communication frequency at the same time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-029368, filed Feb. 18, 2015, which is hereby incorporated by reference herein in its entirety.

What is claimed is:

1. A wireless communication apparatus, comprising:
   an antenna comprising:
      an antenna element having one end portion that is opened; and
      a ground conductor to be used as a ground, to which another end portion of the antenna element is connected;
   a wireless device connected to the antenna; and
   a blocking member, which is arranged so as to be opposed to the antenna, is configured to block an electromagnetic wave radiated from the antenna element, and is not electrically connected to the ground conductor,
   wherein the blocking member is arranged so as to, in a plan view from the blocking member side in a direction toward the antenna, avoid overlapping at least the one end portion of the antenna element and overlap the another end portion of the antenna element.

2. The wireless communication apparatus according to claim 1, wherein the blocking member is arranged so as to, in the plan view from the blocking member side in the direction toward the antenna, avoid overlapping at least a region from an intermediate point of a dimension of the antenna element along the antenna element to the ground conductor, to the one end portion of the antenna element.

3. The wireless communication apparatus according to claim 1,
   wherein in the plan view from the blocking member side in the direction toward the antenna, the antenna element is formed into an L-shape in which the antenna element is folded toward the ground conductor side,
   wherein the ground conductor comprises a first side end portion, which is located on the opened one end portion side of the antenna element, and a second side end portion, which is located on a side opposite to the opened one end portion side of the antenna element, and
   wherein in the plan view from the blocking member side in the direction toward the antenna, the blocking member is arranged so as to avoid overlapping at least one of the first side end portion or the second side end portion.

4. The wireless communication apparatus according to claim 3,
   wherein the another end portion of the antenna element is short-circuited to the ground conductor, and a signal line for connecting the wireless device and the antenna element is connected to a portion of the antenna element located between the one end portion and the another end portion, and
   wherein in the plan view from the blocking member side in the direction toward the antenna, the blocking member is arranged so as to overlap a portion where the signal line and the antenna element are connected.

5. The wireless communication apparatus according to claim 4,
   wherein the antenna comprises a printed wiring board, the printed wiring board comprising a first conductor layer and a second conductor layer adjacent to the first conductor layer through intermediation of an insulator layer,
   wherein the antenna element and the signal line are formed on the first conductor layer,
   wherein the ground conductor comprises a first ground pattern and a second ground pattern, which are formed on the first conductor layer on both sides of the signal line, and a third ground pattern, which is formed on the second conductor layer and is electrically connected to the first ground pattern and the second ground pattern,
   wherein the one end portion of the antenna element is adjacent to the first ground pattern, and the another end portion of the antenna element is connected to the second ground pattern,
   wherein the first side end portion comprises an end portion of the first ground pattern, which is located on one side of the first ground pattern opposite to another side thereof that is adjacent to the signal line extending in a wiring direction, and
   wherein the second side end portion comprises an end portion of the second ground pattern, which is located on one side of the second ground pattern opposite to another side thereof that is adjacent to the signal line extending in the wiring direction.

6. The wireless communication apparatus according to claim 1,
   wherein the another end portion of the antenna element is short-circuited to the ground conductor, and a signal line for connecting the wireless device and the antenna element is connected to a portion of the antenna element located between the one end portion and the another end portion, and
   wherein in the plan view from the blocking member side in the direction toward the antenna, the blocking member is further arranged so as to overlap the signal line.

7. The wireless communication apparatus according to claim 1,
   wherein the blocking member is formed into a plate shape, and wherein the blocking member has an end portion folded toward the antenna side so as to surround the antenna.

8. The wireless communication apparatus according to claim 1, wherein a thickness d of the blocking member satisfies $d \geq \sqrt{2 \times \rho / \omega \mu}$, where $\rho$ denotes resistivity of the blocking member, $\omega$ denotes angular frequency of current flowing through the antenna, and $\mu$ denotes permeability of the blocking member.

9. A wireless communication apparatus, comprising:
an antenna comprising:
an antenna element having one end portion that is opened; and
a ground conductor to be used as a ground, to which another end portion of the antenna element is connected;
a wireless device connected to the antenna; and
a blocking member, which is arranged so as to be opposed to the antenna, is configured to block an electromagnetic wave radiated from the antenna element, and is not electrically connected to the ground conductor,
wherein the blocking member is arranged so as to, in a plan view from the blocking member side in a direction toward the antenna, avoid overlapping at least a position where an electric field strength of the antenna is largest.

10. The wireless communication apparatus according to claim 9,
wherein the blocking member is formed into a plate shape, and
wherein the blocking member has an end portion folded toward the antenna side so as to surround the antenna.

11. The wireless communication apparatus according to claim 9, wherein a thickness of the blocking member d satisfies $d \geq \sqrt{2 \times \rho / \omega \mu}$, where $\rho$ denotes resistivity of the blocking member, $\omega$ denotes angular frequency of current flowing through the antenna, and $\mu$ denotes permeability of the blocking member.

12. An electronic apparatus, comprising:
a wireless communication apparatus,
the wireless communication apparatus comprising:
an antenna comprising:
an antenna element having one end portion that is opened; and
a ground conductor to be used as a ground, to which another end portion of the antenna element is connected;
a wireless device connected to the antenna; and
a blocking member, which is arranged so as to be opposed to the antenna, is configured to block an electromagnetic wave radiated from the antenna element, and is not electrically connected to the ground conductor,
wherein the blocking member is arranged so as to, in a plan view from the blocking member side in a direction toward the antenna, avoid overlapping at least the one end portion of the antenna element and overlap the another end portion of the antenna element.

13. The electronic apparatus according to claim 12, wherein a thickness d of the blocking member satisfies $d \geq \sqrt{2 \times \rho / \omega \mu}$, where $\rho$ denotes resistivity of the blocking member, $\omega$ denotes angular frequency of current flowing through the antenna, and $\mu$ denotes permeability of the blocking member.

14. The electronic apparatus according to claim 12, further comprising a housing covering the wireless communication apparatus,
wherein the antenna element and the blocking member are arranged along a wall surface of the housing, and
wherein the blocking member is arranged between the wall surface of the housing and the antenna element.

* * * * *